(12) United States Patent
Koishi

(10) Patent No.: US 10,237,485 B2
(45) Date of Patent: Mar. 19, 2019

(54) IMAGE PROCESSING APPARATUS, IMAGING APPARATUS, AND IMAGE PROCESSING METHOD

(71) Applicant: OLYMPUS CORPORATION, Hachioji-shi, Tokyo (JP)

(72) Inventor: Natsumi Koishi, Hino (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/492,855

(22) Filed: Apr. 20, 2017

(65) Prior Publication Data
US 2017/0310897 A1    Oct. 26, 2017

(30) Foreign Application Priority Data
Apr. 20, 2016  (JP) ................. 2016-084744

(51) Int. Cl.
*H04N 5/232* (2006.01)
*H04N 5/217* (2011.01)
*H04N 5/357* (2011.01)

(52) U.S. Cl.
CPC ..... *H04N 5/23287* (2013.01); *H04N 5/23254* (2013.01); *H04N 5/23267* (2013.01)

(58) Field of Classification Search
CPC ........... H04N 5/23254; H04N 5/23258; H04N 5/23267; H04N 5/23287; H04N 5/23272; H04N 5/217
USPC ..... 348/208.4, 208.5, 208.11, 208.99, 208.1, 348/208.12, 222.1, 208.13; 382/255, 264, 382/254, 275, 263, 266; 359/16, 637
See application file for complete search history.

(56) References Cited

U.S. PATENT DOCUMENTS

| | | | |
|---|---|---|---|
| 8,395,677 B2* | 3/2013 | Kikuch | H04N 5/228 348/222.1 |
| 9,077,842 B2* | 7/2015 | Natsume | H04N 5/217 348/336 |
| 9,392,176 B2 | 7/2016 | Tsubaki | |
| 9,998,652 B2* | 6/2018 | Hamano | H04N 5/23212 |
| 2006/0228097 A1* | 10/2006 | Higurashi | G02B 27/646 396/55 |

FOREIGN PATENT DOCUMENTS

JP    2015022027 A    2/2015

* cited by examiner

*Primary Examiner* — Marly S Camargo
(74) *Attorney, Agent, or Firm* — Holtz, Holtz & Volek PC

(57) ABSTRACT

An image processing apparatus includes a vibration-proof optical system driving amount acquiring section, a distortion aberration correcting section, and a deviation amount converting section. The vibration-proof optical system driving amount acquiring section acquires a driving amount of the vibration-proof optical system. The distortion aberration correcting section corrects a distortion aberration on based on a deviation amount to a captured image. The deviation amount converting section calculates the deviation amount corresponding to the driving amount on the basis of a correlation between a shape of the distortion aberration corresponding to the driving amount of the vibration-proof optical system and a shape of the distortion aberration corresponding to the deviation amount.

14 Claims, 20 Drawing Sheets

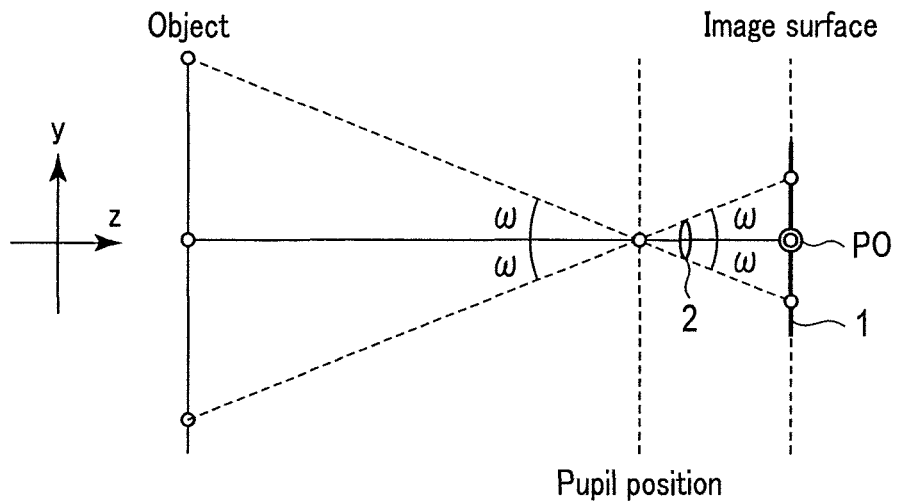
F I G. 1A
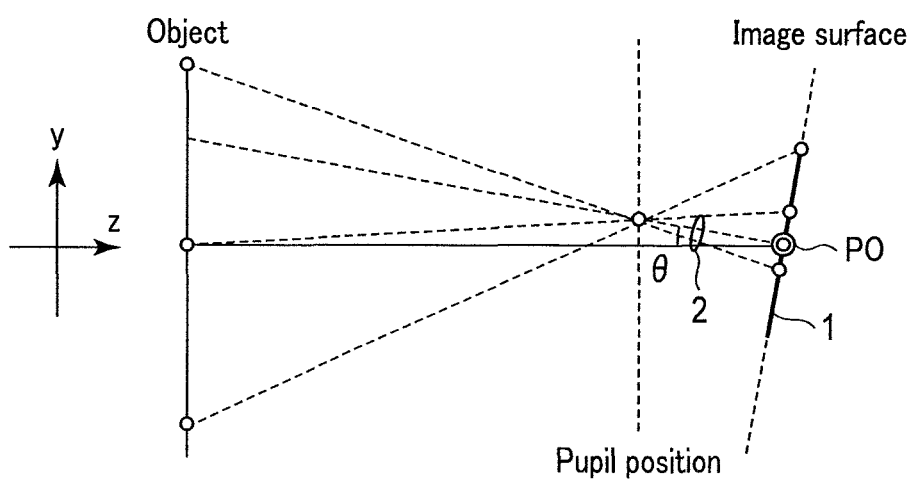
F I G. 1B

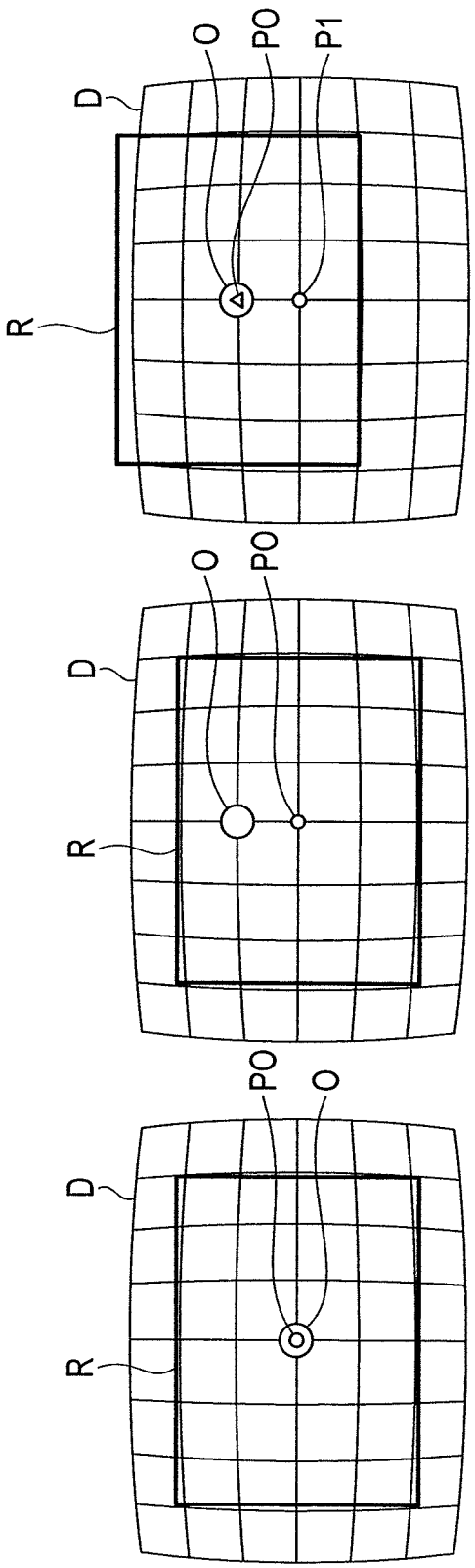

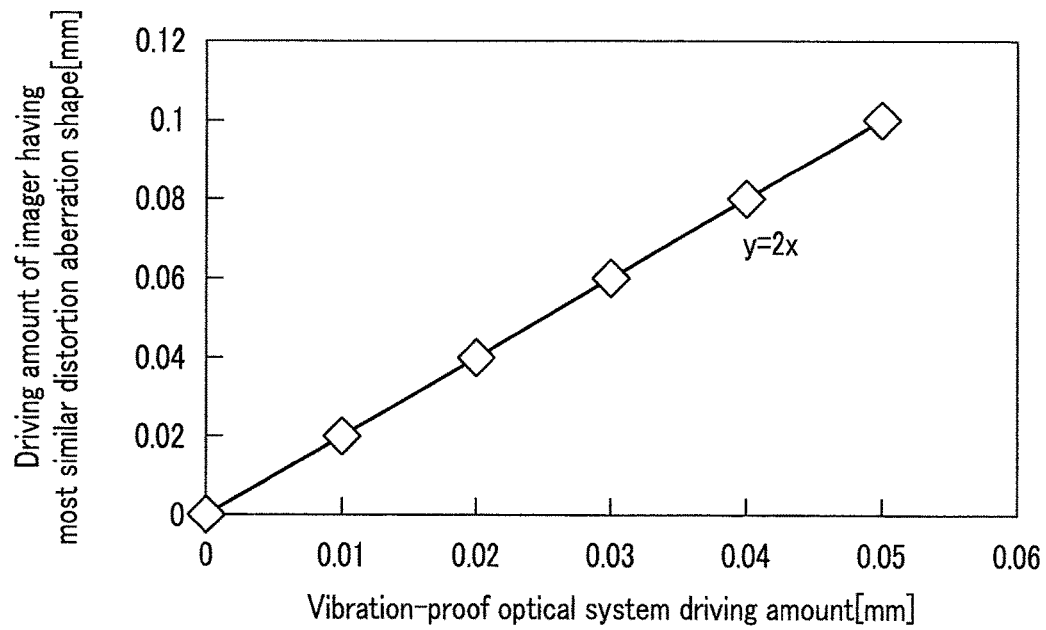
F I G. 6A
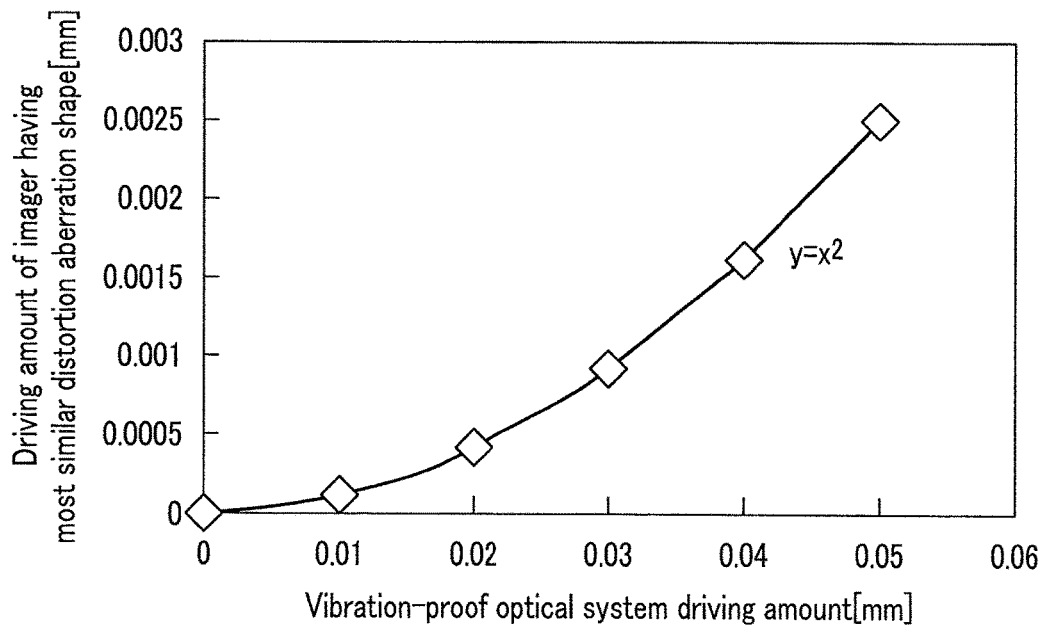
F I G. 6B

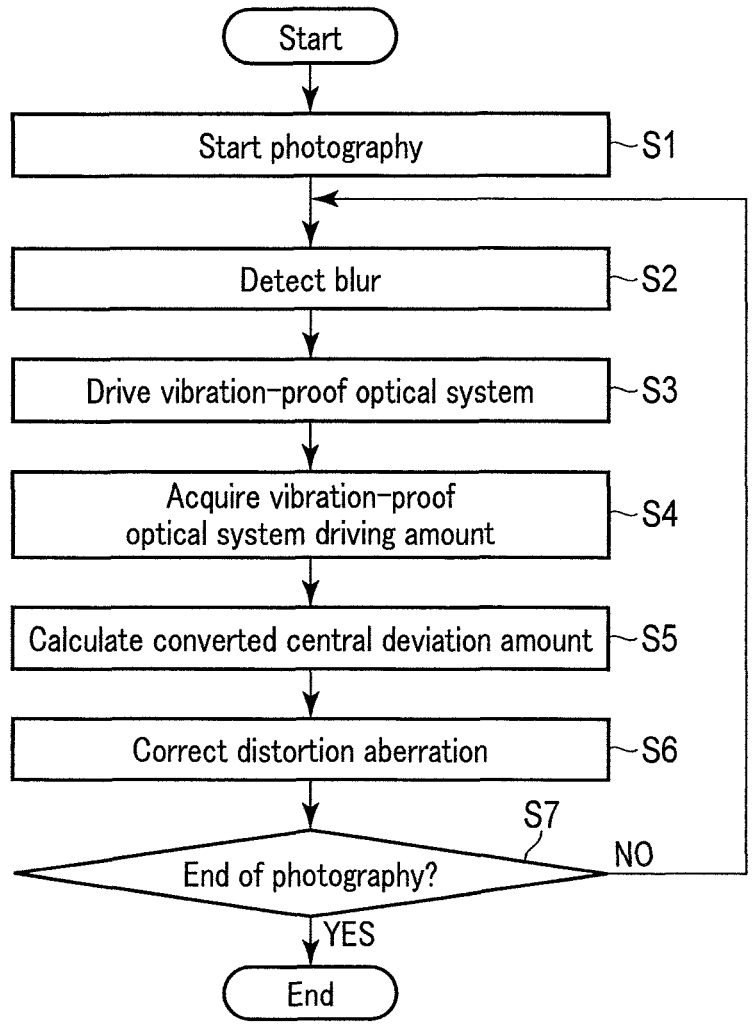
F I G. 8

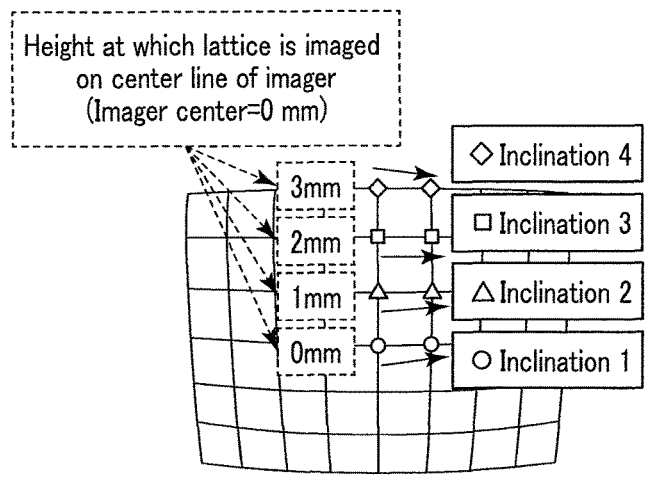
FIG. 11
| | Height at which lattice is imaged on center line of imager Y[mm] (Imaging element center=0mm) | Inclination x |
|---|---|---|
| Inclination 4 | 3 | −0.1 |
| Inclination 3 | 2 | 0.1 |
| Inclination 2 | 1 | 0.2 |
| Inclination 1 | 0 | 0.3 |
FIG. 12
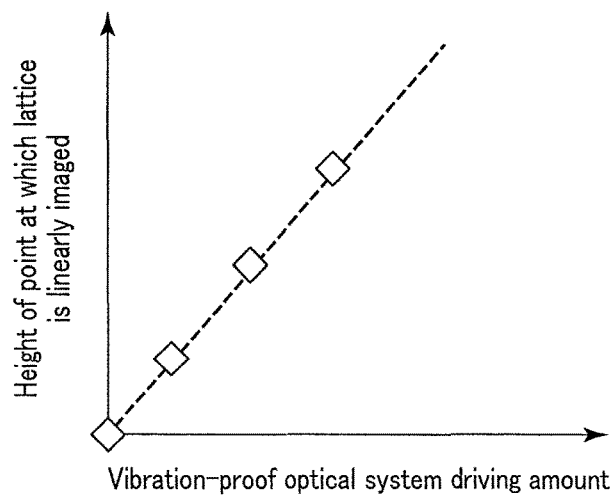
FIG. 13

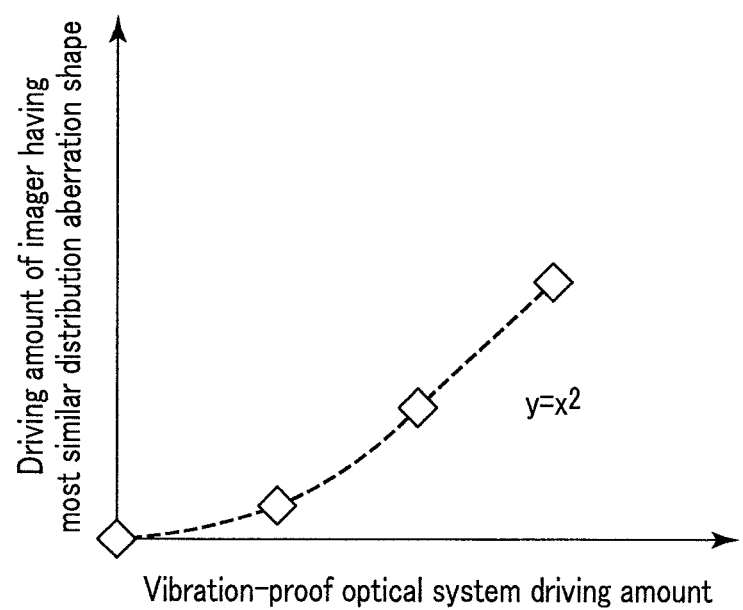
F I G. 17

| Vibration-proof optical system driving amount[mm] | Driving amount of imager having most similar distortion aberration shape (converted central deviation amount) |
|---|---|
| 0.1 | 0.3 |
| 0.2 | 0.65 |
| 0.3 | 1.45 |

| Focal distance | 10mm | | | 20mm | | | ... | 50mm | | |
|---|---|---|---|---|---|---|---|---|---|---|
| Focal position | Near | Middle | Infinite | Near | Middle | Infinite | ... | Near | Middle | Infinite |
| Coefficient $\alpha$ | $\alpha_{10\_near}$ | $\alpha_{10\_middle}$ | $\alpha_{10\_inf}$ | $\alpha_{20\_near}$ | $\alpha_{20\_middle}$ | $\alpha_{20\_inf}$ | ... | $\alpha_{50\_near}$ | $\alpha_{50\_middle}$ | $\alpha_{50\_inf}$ |

F I G. 23

IMAGE PROCESSING APPARATUS, IMAGING APPARATUS, AND IMAGE PROCESSING METHOD

CROSS-REFERENCE TO RELATED APPLICATIONS

This application is based upon and claims the benefit of priority from the prior Japanese Patent Application No. 2016-084744, filed Apr. 20, 2016, the entire contents of which are incorporated herein by reference.

BACKGROUND OF THE INVENTION

1. Field of the Invention

The present invention relates to an image processing apparatus, an imaging apparatus, and an image processing method.

2. Description of the Related Art

As a technique to suppress a blur in a captured image due to camera shake or the like in an imaging apparatus, there is known optical blur suppression processing of driving a vibration-proof optical system, which is provided to constitute a part of an imaging optical system, in correspondence with a generated blur. Further, a captured image obtained through the imaging optical system is distorted due to an influence of a distortion aberration or the like of the imaging optical system. Such a distortion aberration or the like is usually corrected by geometric conversion processing. An imaging apparatus suggested in Jpn. Pat. Appln. KOKAI Publication No. 2015-022027 intends to improve an accuracy of distortion aberration correction by determining a reference coordinate of the geometric conversion processing in correspondence with a driving amount and a driving direction of a vibration-proof optical system.

BRIEF SUMMARY OF THE INVENTION

According to a first aspect of the invention, there is provided an image processing apparatus which processes a captured image based on an image formed on an image surface of an imager by an imaging optical system including a vibration-proof optical system which is driven in correspondence with an image blur on the image surface, comprising: a vibration-proof optical system driving amount acquiring section which acquires a driving amount of the vibration-proof optical system in a direction orthogonal to an optical axis of the imaging optical system; a distortion aberration correcting section which uses a deviation amount between the optical axis and an image center of the captured image to correct a distortion aberration on the image surface based on the deviation amount to the captured image; and a deviation amount converting section which calculates the deviation amount corresponding to the driving amount acquired by the vibration-proof optical system driving amount acquiring section as a converted central deviation amount on the basis of a correlation between a shape of the distortion aberration on the image surface corresponding to the driving amount of the vibration-proof optical system and a shape of the distortion aberration on the image surface corresponding to the deviation amount, wherein the distortion aberration correcting section corrects the distortion aberration by using the converted central deviation amount as the deviation amount.

According to a second aspect of the invention, there is provided an image processing method of processing a captured image based on an image formed on an image surface of an imager by using an imaging optical system including a vibration-proof optical system which is driven in correspondence with an image blur on the image surface, the method comprising: acquiring a driving amount of the vibration-proof optical system in a direction orthogonal to an optical axis of the imaging optical system; calculating the deviation amount corresponding to the driving amount of the vibration-proof optical system as a converted central deviation amount on the basis of a correlation between a shape of a distortion aberration on the image surface corresponding to the driving amount of the vibration-proof optical system and a shape of a distortion aberration on the image surface corresponding to the deviation amount; and correcting the distortion aberration by using the converted central deviation amount as the deviation amount.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1A and FIG. 1B are views for explaining an image blur;

FIG. 3A is a view showing a captured image in which no image blur is produced;

FIG. 3B is a view showing a captured image in which an image blur is produced;

FIG. 3C is a view showing a captured image after the imager shift type or electronic type image stabilization processing is applied to the image blur in FIG. 3B;

FIG. 6A and FIG. 6B are views each showing an example of a correlation between a driving amount of the vibration-proof optical system and a driving amount of an imager having similar shapes of the distortion aberration on an image surface;

FIG. 8 is a flowchart showing a photographing operation in the first embodiment;

FIG. 11 is a view for explaining how to obtain an inclination between a point and a point on the same line in a captured image;

FIG. 12 shows an example of the inclination between the point and the point on the same line in the captured image;

FIG. 13 is a view showing a straight line which is an example obtained by plotting heights of points having a linear lattice to a driving amount of the vibration-proof optical system;

FIG. 17 is a view showing a curved line which is an example obtained by plotting relationships between a driving amount of a vibration-proof optical system 104 and a driving amount of an imager 202;

FIG. 23 is a view showing an example of a table in which an optical state is associated with the coefficient α.

DETAILED DESCRIPTION OF THE INVENTION

Embodiments according to the present invention will now be described hereinafter with reference to the drawings. First, a principle of an image processing method according to each embodiment of the present invention will be described. Therefore, a description will be given as to image stabilization processing. FIG. 1A and FIG. 1B are views for explaining an image blur. FIG. 1A shows a relationship between an object and an imaging apparatus when no blur is produced in the imaging apparatus. FIG. 1B shows a relationship between the object and the imaging apparatus when an angular blur of an angle θ is produced at an image center of the imaging apparatus. A z axis in FIG. 1A and FIG. 1B is, e.g., a direction horizontal to the ground, and a y axis in the same is, e.g., a direction vertical to the ground.

Luminous fluxes from arbitrary object points of an object form an image at a pupil position and passes through a vibration-proof optical system 2, and an image is again formed on an image surface of an imager 1. Both incidence angles and exit angles of these luminous fluxes are ω. When no blur is produced in the imaging apparatus, a y axis position at an optical axis center of an imaging optical system coincides with that at an image surface center (which is assumed to coincide with an image center) of the imager. Thus, light passing through the optical axis center of the imaging optical system enters the image surface center P0 of the imager 1 through the optical axis center of the vibration-proof optical system 2. On the other hand, when an image blur of an angle θ is produced in the imaging apparatus, the y axis position at the optical axis center of the imaging optical system deviates from the y axis position at the image surface center of the imager 1. The luminous fluxes emitted from the same object point of the object form images at different positions of the imager depending on a size of this deviation. The deviation of the image forming positions produces an image blur. Such an image blur is produced due to not only an angular blur but also a translational blur which is movement of the imaging apparatus in a direction parallel to the image surface.

Figure 2A:
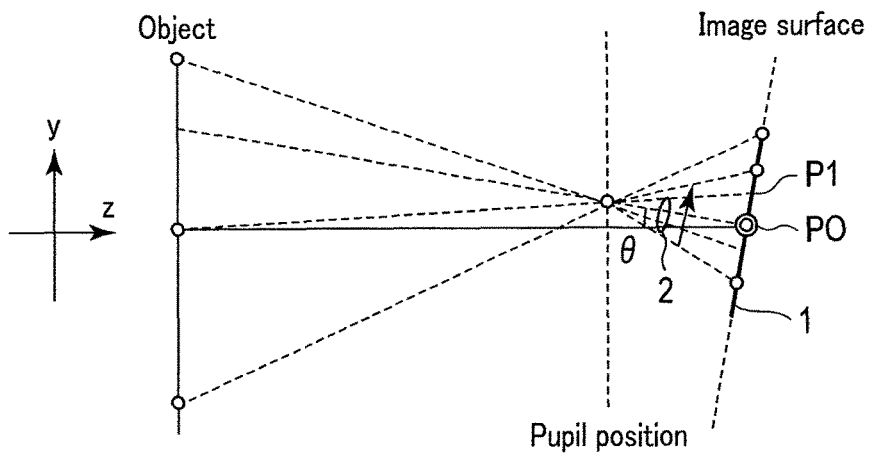
FIG. 2A is a view for explaining optical system shift type image stabilization processing.
Figure 2B:
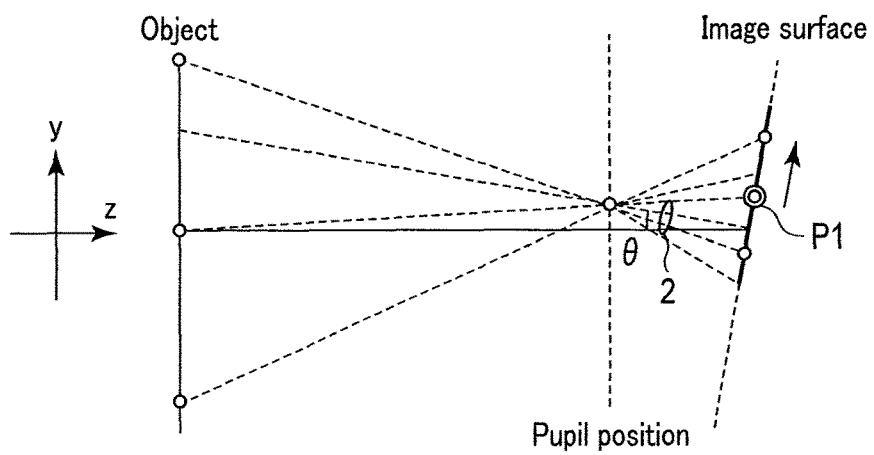
FIG. 2B is a view for explaining imager shift type image stabilization processing.
Figure 2C:
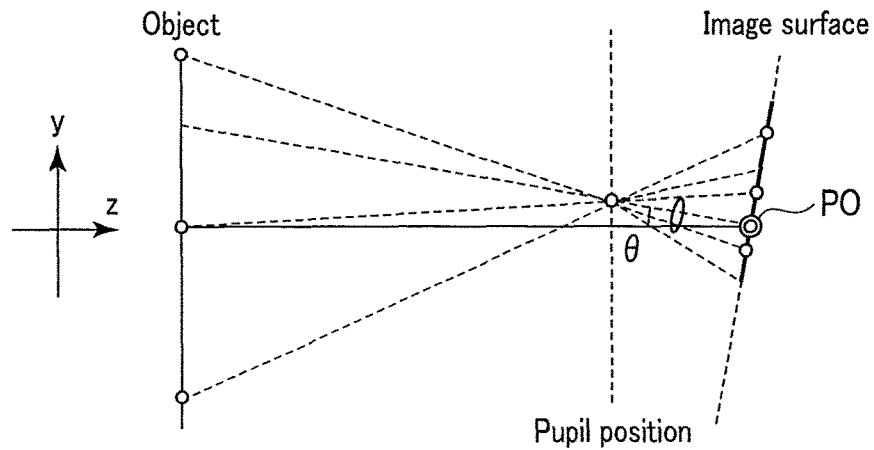
FIG. 2C is a view for explaining an electronic type image stabilization system.

As a blur suppression method for suppression of an image blur, there are mainly known three methods, i.e., an optical system shift type, an imager shift type, and an electronic type. As shown in FIG. 2A, the optical system shift type image stabilization processing is processing which suppresses a blur by driving the vibration-proof optical system 2 as a part of the imaging optical system within a plane orthogonal to an optical axis of the imaging optical system in correspondence with the detected blur. That is, according to the optical system shift type image stabilization processing, the image surface center P0 does not move, but the imaging forming position of the luminous fluxes moves to P1. As shown in FIG. 2B, the imager shift type image stabilization processing is processing which suppresses a blur by driving the imager 1 within a plane orthogonal to the optical axis of the imaging optical system in correspondence with the detected blur. That is, according to the imager shift type image stabilization processing, the image surface center P0 moves to P1. As shown in FIG. 2C, the electronic type image stabilization processing is processing which suppresses a blur by changing a cutout range of a captured image (within a plane orthogonal to the optical axis) in correspondence with the detected blur. That is, according to the electronic type image stabilization processing, both the image surface center P0 and the image forming position do not move, but the cutout range of the captured image alone is changed.

FIG. 3A shows a captured image in which no image blur is produced. Assuming that the optical axis of the imaging optical system is matched with the object, when no image blur is produced, a position of the object O on the image surface coincides with a position of the image center P0. Further, an intersection point position of the optical axis of the imaging optical system and the image surface coincides with the image center P0. No matter if a distortion aberration is a barrel type distortion aberration or a pincushion type distortion aberration, the aberration is point-symmetrically produced with the optical axis of the imaging optical system at the center. Thus, in case of FIG. 3A, an aberration D which affects the captured image has a point-symmetrical shape with the image center P0 at the center.

FIG. 3B shows a captured image in which an image blur is produced. Since the optical axis of the imaging optical system deviates from the object due to a blur of the imaging apparatus, a position of the object O on the image surface shifts from a position of the image center P0. On the other hand, when the image stabilization processing is not executed, an intersection point position of the optical axis of the imaging optical system and the image surface coincides with the image center P0. Thus, in case of FIG. 3B, the aberration D which affects the captured image has a point-symmetrical shape with the image center P0 at the center.

FIG. 3B is a view showing the captured image in which the image blur is produced, and FIG. 3C shows a captured image after the imager shift type or electronic type image stabilization processing is applied to the image blur in FIG. 3B. The image center P0 is matched with a position of the object O by the image stabilization processing. On the other hand, an intersection point position P1 of the optical axis of the imaging optical system and the image surface deviates from the image center P0. Thus, in case of FIG. 3C, the aberration D which affects the captured image has a point-asymmetrical shape. Comparing the aberration D in FIG. 3C with the aberrations D in FIG. 3A and FIG. 3B, a shape of the distortion aberration D in FIG. 3C seems to have deformed by the image stabilization processing.

Figure 4:
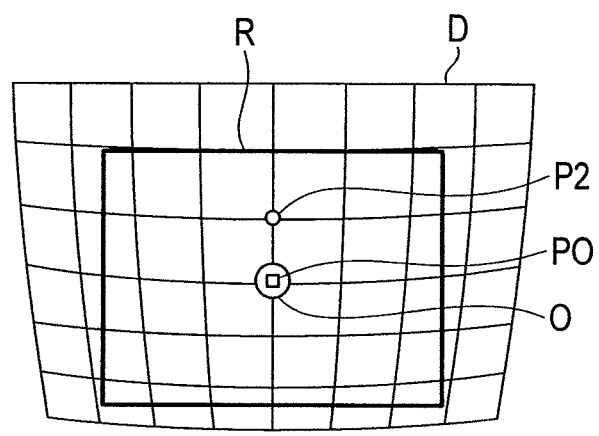
FIG. 4 is a view showing a captured image after the optical system shift type image stabilization processing is applied to the image blur in FIG. 3B.

On the other hand, FIG. 4 shows a captured image after the optical system shift type image stabilization processing is applied to the image blur in FIG. 3B. As shown in FIG. 4, in case of the optical system shift type image stabilization processing, the intersection point position P0 of the optical axis of the imaging optical system and the image surface is matched with a position of the object O. As described above, the aberration is point-symmetrically produced with the optical axis of the imaging optical system at the center. Thus, the aberration D, which is point-symmetrically produced before the blur suppression processing with an intersection point P2 of the optical axis of vibration-proof optical system 2 before driving and the image surface at the center is point-asymmetrically produced with the intersection point P0 of the optical axis of the vibration-proof optical system 2 after driving and the image surface as a result of the image stabilization processing. Comparing the aberration D in FIG. 4 with the aberration D in FIG. 3A or FIG. 3B, a shape of the aberration D in FIG. 4 seems to have deformed by the image stabilization processing.

As a method of accurately correcting a change in shape of the distortion aberration associated with the image stabilization processing, a method of correcting the distortion aberration while taking a change in distortion aberration shape into account can be considered. In usual distortion aberration correction, a relationship between an ideal image height Y (an image height after correction) and an actual image height Y' (an image height before correction) is defined in advance. This relationship is defined by, e.g., an approximate polynomial such as Expression (1). Furthermore, in actual processing, the distortion aberration correction is performed by coordinate conversion using the previously defined relationship. Specifically, a correspondence coordinate of an image before correction and an image after correction is calculated by using a defining equation, and respective pixels in the image before correction are rearranged on the basis of this correspondence coordinate to perform the correction.

$$Y = D0 + D1Y' + D2Y'^2 + D3Y'^3 + \ldots \quad \text{Expression (1)}$$

In the distortion aberration correction for the captured image after the imager shift type or electronic type image stabilization processing, a change in distortion shape can be also corrected by the normal distortion aberration correction taking a deviation amount of the image center and the optical axis center (a center of generation of the original distortion aberration) into account. On the hand, since a change in shape of the distortion aberration due to eccentricity of the vibration-proof optical system is different from a change in shape of the distortion aberration due to a deviation of the image center and the optical center in the principle of generation, even if the normal distortion aberration correction taking the deviation amount of the image center and the optical center into account is performed, the correction is incomplete.

Figure 5:
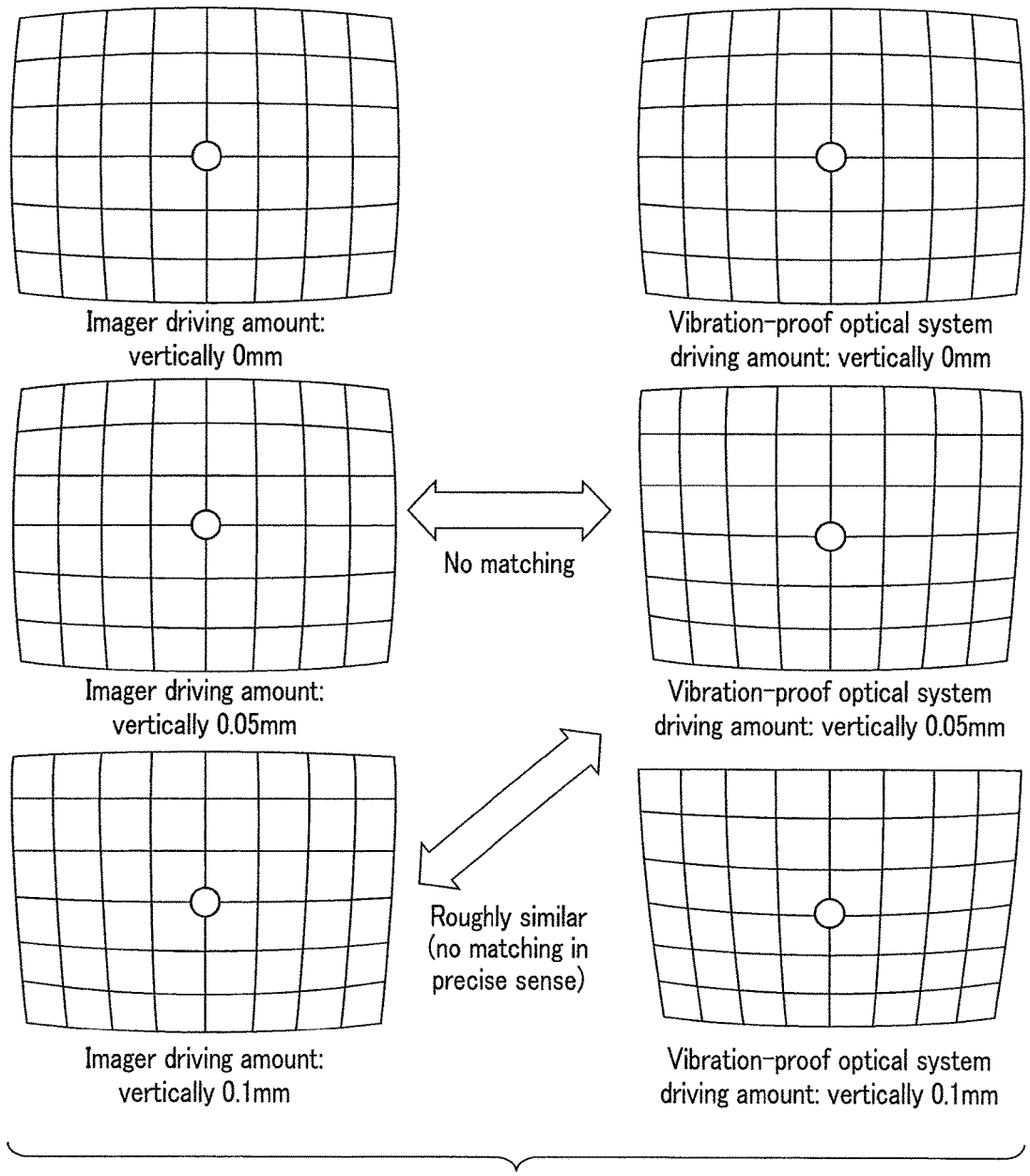
FIG. 5 is a view showing an example of a relationship between a change in shape of a distortion aberration caused due to eccentricity of a vibration-proof optical system and a change in shape of the distortion aberration caused due to a deviation between an image center and an optical axis center.

Although a change in shape of the distortion aberration due to eccentricity of the vibration-proof optical system is different from the change in shape of the distortion aberration due to the deviation of the image center and the optical axis center in the principle of generation, they have substantially similar properties. FIG. 5 is a view showing an example of a relationship between the change in shape of the distortion aberration due to the eccentricity of the vibration-proof optical system and the change in shape of the distortion aberration due to the deviation of the image center and the optical axis center. In FIG. 5, to intelligibly show changes in shape of the distortion aberration only, the object as a photographing target is assumed to be an object having a lattice pattern. Moreover, the left side in FIG. 5 shows distortion aberration shapes in a captured image when the object is imaged in a state where an imaging system (the imaging apparatus having the imaging optical system disposed thereto) is shifted 0 mm in the vertical direction, 0.05 mm in the vertical direction, and 0.1 mm in the vertical direction and the imager is driven for 0 mm in the vertical direction, 0.05 mm in the vertical direction, and 0.1 mm in the vertical direction so that image blurs produced due to such shifting can be corrected. The right side in FIG. 5 shows distortion aberration shapes in the captured image when the object is imaged in a state where the imaging system (the imaging apparatus having the imaging optical system disposed thereto) is shifted 0 mm in the vertical direction, 0.05 in the vertical direction, and 0.1 mm in the vertical direction under the same conditions as those of the left side in FIG. 5 and the vibration-proof optical system is driven for 0 mm in the vertical direction, 0.05 mm in the vertical direction, and 0.1 mm in the vertical direction so that image blurs due to such shifting can be corrected. It is to be noted that, to simplify the description, it is assumed that, when the vibration-proof optical system is driven for 1 mm, an image moves 1 mm on an image surface. Depending on a structure of the vibration-proof optical system, a driving amount d of the vibration-proof optical system does not necessarily coincide with a moving amount m on in the image surface, and such a proportional relation as represented by Expression (2) is provided. In FIG. 5, image surface moving mount sensitivity s is considered to be 1. At this time, the imager and the vibration-proof optical system have the same driving amount which is required for suppression of the same blur.

$$m = s \times d \quad \text{Expression (2)}$$

$$\text{where } s = (1 - \beta 2) \times \beta 3 \quad \text{Expression (3)}$$

($\beta 2$: a magnifying power of the vibration-proof optical system, $\beta 3$: a magnifying power of a rear group of the vibration-proof optical system in the imaging optical system)

As can be understood from FIG. 5, even if the distortion aberration shapes are compared under the conditions that the driving amount of the imager becomes equal to the driving amount of the vibration-proof optical system, both the distortion aberration shapes do not coincide with each other. However, in case of FIG. 5, the distortion aberration shape in a state where the vibration-proof optical system is driven for 0.05 mm is similar to the distortion aberration shape in a state where the imager is driven for 0.1 mm.

Thus, in a case where the captured image in a state where the vibration-proof optical system is to be driven 0.5 mm is to be corrected, if a "mechanism which can correct a distortion aberration point-symmetrically produced with the optical axis at the center while considering a deviation between the image center and the optical axis center" such as Expression (1) is present, giving 0.1 mm as a deviation amount between the image center and the optical axis center to this mechanism can suffice. Consequently, a change in shape of the distortion aberration associated with driving of the vibration-proof optical system (realization of the point-asymmetry of the distortion aberration shape) can be roughly corrected.

In the specific processing, for example, a correlation between the driving amount of the vibration-proof optical system and the driving amount of the imager which have similar distortion aberration shapes on the image surface is defined in advance. Additionally, when the vibration-proof optical system is driven, the driving amount of the vibration-proof optical system is converted into the driving amount of the imager, and the distortion aberration correction based on, e.g., Expression (1) is performed in conformity to a driving amount after the conversion. Each of FIG. 6A and FIG. 6B shows an example of a correlation between the driving amount of the vibration-proof optical system and the driving amount of the imager which have similar distortion aberration shapes on the image surface. FIG. 6A shows an example in which the correlation is linear. When the correlation is linear, in the distortion aberration correction, the conversion is performed by multiplying the driving amount of the vibration-proof optical system by a predetermined coefficient. On the other hand, FIG. 6B shows an example in which the correlation is non-linear. In case of the non-linear shape, an approximate expression representing this curved line is defined in advance. Further, in the distortion aberration correction, the driving amount of the vibration-proof optical system is converted by using the approximate expression. The relationship in FIG. 6B is approximated by, e.g., a quadratic expression. However, it does not have to be necessarily approximated by the quadratic expression. Although the relationship in FIG. 6B is approximated by an expression of an appropriate degree which is a cubic expression or an expression of a higher degree, the present invention is not restricted thereto. Furthermore, the approximation may be carried out by using an appropriate mathematical expression without being restricted to a polynomial.

First Embodiment

Figure 7:
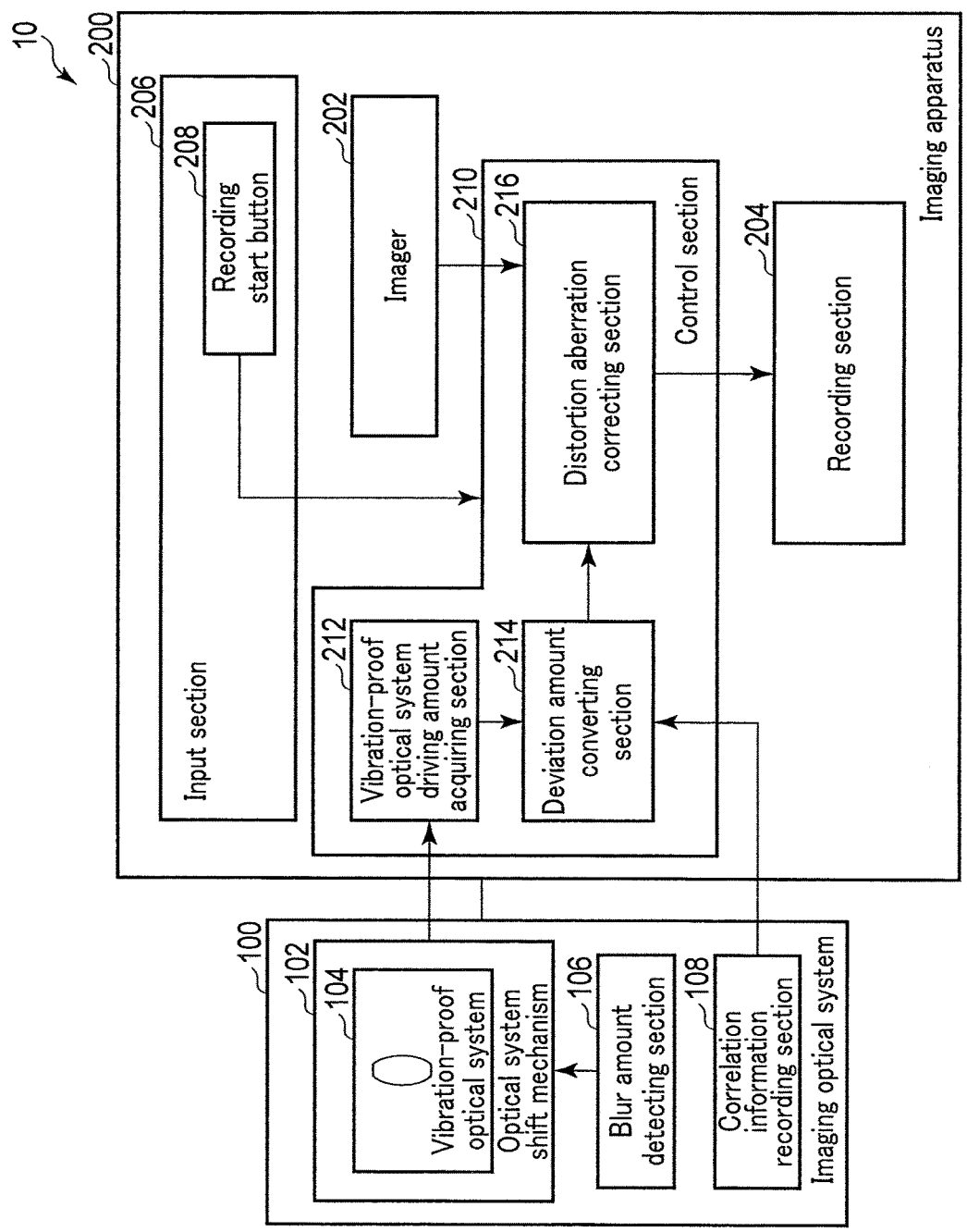
FIG. 7 is a view showing a configuration of an imaging system according to a first embodiment.

FIG. 7 is a view showing a configuration of an imaging system according to a first embodiment. An imaging system 10 includes an imaging optical system 100 and an imaging apparatus 200. The imaging optical system 100 is attached to the imaging apparatus 200. When the imaging optical system 100 is attached to the imaging apparatus 200, the imaging optical system 100 is connected to the imaging apparatus 200 to freely enable communication between them. At this time, the imaging optical system 100 operates under control of the imaging apparatus 200.

The imaging optical system 100 includes an optical system shift mechanism 102, a blur amount detecting section 106, and a correlation information recording section 108.

The optical system shift mechanism 102 includes an optical system configured to condense luminous fluxes from an object onto an image surface of an imager. Furthermore, the optical system shift mechanism 102 includes a vibration-proof optical system 104. The optical system shift mechanism 102 drives the vibration-proof optical system 104 within a plane orthogonal to an optical axis of the optical system shift mechanism 102 in correspondence with a blur amount of the imaging optical system 100 detected by the blur amount detecting section 106. The vibration-proof optical system 104 changes an image-forming position of the luminous fluxes from the object, thereby suppressing a blur.

The blur amount detecting section 106 is, e.g., a gyro sensor or an acceleration sensor, and detects a blur amount produced in the imaging optical system 100. This blur includes, e.g., an angular blur and a rotational blur around orthogonal three axes defined in the imaging optical system 100. Moreover, this blur may include, e.g., a translational blur parallel to the orthogonal three axes defined in the imaging optical system 100.

The correlation information recording section 108 is, e.g., a flash memory. The correlation information recording section 108 records information indicative of a correlation between a shape of a distortion aberration on an image surface of an imager 202 corresponding to a driving amount of the vibration-proof optical system 104 and a shape of a distortion aberration on the image surface of the imager 202 corresponding to a deviation between an image center and an optical axis center. For example, as the information indicative of the correlation, a coefficient α used for, e.g., conversion of a driving amount of the vibration-proof optical system into a driving amount of the imager can be recorded. Particulars of this coefficient α will be described later.

The imaging apparatus 200 includes the imager 202, a recording section 204, an input section 206, and a control section 210.

The imager 202 has an image surface constituted of pixels. Each pixel is constituted of a photoelectric conversion element such as a photodiode, and generates an electric charge corresponding to an amount of incident light. The imager 202 having such a configuration generates an image signal (a captured image) corresponding to luminous fluxes which have struck upon the image surface. In this embodiment, a system of the imager 202 may be either a CCD system or a CMOS system. Additionally, a color filter or a micro lens may be placed in front of the pixels.

The recording section 204 is a memory which is incorporated in the imaging apparatus 200 or attached to the imaging apparatus 200. The recording section 204 records an image file acquired as a result of photographing processing.

The input section 206 is, e.g., an operation member configured to issue various kinds of instructions to the imaging apparatus 200 by a photographer. The input section 206 includes, e.g., a recording start button 208. The recording start button 208 is an operation member configured to issue an instruction to start recording an image to the imaging apparatus 200. It is to be noted that input section 206 may have any other operation member such as a touch panel.

The control section 210 is constituted as a control circuit, e.g., a CPU or an ASIC. The control section 210 controls various kinds of operations of the imaging apparatus 200. The control section 210 in this embodiment includes a vibration-proof optical system driving amount acquiring section 212, a deviation amount converting section 214, and a distortion aberration correcting section 216.

The vibration-proof optical system driving amount acquiring section 212 acquires a driving amount from the vibration-proof optical system 104. The driving amount is detected by an encoder or the like.

The deviation amount converting section 214 converts the driving amount of the vibration-proof optical system 104 into a deviation amount between the image center and the optical axis center involved in driving of the imager 202 by using the information indicative of the correlation recorded in the correlation information recording section 108.

The distortion aberration correcting section 216 performs distortion aberration correction to a captured image obtained by the imager 202. The distortion aberration correction is performed in conformity with Expression (1) described above. It is to be noted that the distortion aberration correcting section 216 may be configured to carry out the distortion aberration correction as well as various kinds of image processing (white balance correction, gradation correction, and the like) other than the distortion aberration correction.

Each function of the above-described control section 210 may be realized by single hardware or software, or may be realized by pieces of hardware or software. Further, some functions may be provided separately from the control section 210. Furthermore, some functions may be provided separately from the imaging apparatus 200. For example, the vibration-proof optical system driving amount acquiring section 212, the deviation amount converting section 214, and the distortion aberration correcting section 216 may be provided in an image processing apparatus configured to enable communication with the imaging apparatus 200. This image processing apparatus may or may not have an imaging function.

An operation of the imaging system 10 in the first embodiment will now be described hereinafter. FIG. 8 is a flowchart showing a photographing operation including an image processing method in the first embodiment. Here, FIG. 8 is a flowchart of a moving image photographing operation. However, the distortion aberration correction described in the following moving image photographing operation can be applied even during a still image photographing operation.

The operation in FIG. 8 is started when, for example, a photographer pushes the recording start button 208. When the operation in FIG. 8 is started, at a step S1, the control section 210 starts the photographing operation. Specifically, the control section 210 starts a repetitive exposure operation using the imager 202.

At a step S2, the blur amount detecting section 106 detects a blur amount of the imaging optical system 100. At a step S3, the optical system shift mechanism 102 drives the vibration-proof optical system 104 so that a blur of the imaging optical system 100 detected by the blur amount detecting section 106 is canceled. Consequently, a blur (an image blur) on the image surface of the imager 202 is suppressed.

At a step S4, the control section 210 acquires a driving amount of the vibration-proof optical system by using the vibration-proof optical system driving amount acquiring section 212.

At a step S5, the control section 210 converts the driving amount of the vibration-proof optical system 104 into a deviation amount between the image center and the optical axis center involved in driving of the imager 202 by the deviation amount converting section with the use of the information of correlation recorded in the correlation information recording section 108. The converted deviation amount will be referred to as a converted central deviation amount hereinafter. The converted central deviation amount is calculated by, e.g., multiplying the driving amount of the vibration-proof optical system by a coefficient α (a value indicative of a correlation between a distortion aberration shape involved in the deviation amount of the image center and the optical axis center and a distortion aberration shape involved in driving of the vibration-proof optical system) if the correlation between the driving amount of the vibration-proof optical system and the driving amount of the imager which have similar distortion aberration shapes on the image surface is linear.

The coefficient α is determined by searching for how much the image center deviates from the optical center (how much the imager 202 is driven) to realize the highest similarity (the correlation) between the distortion aberration shape in this a situation and the distortion aberration shape on the image surface when the vibration-proof optical system 104 is driven for an arbitrary amount, and linearly approximating this relationship. Here, the search for the correlation may be visually performed or may be performed by using a calculation described below.

Figure 9A:
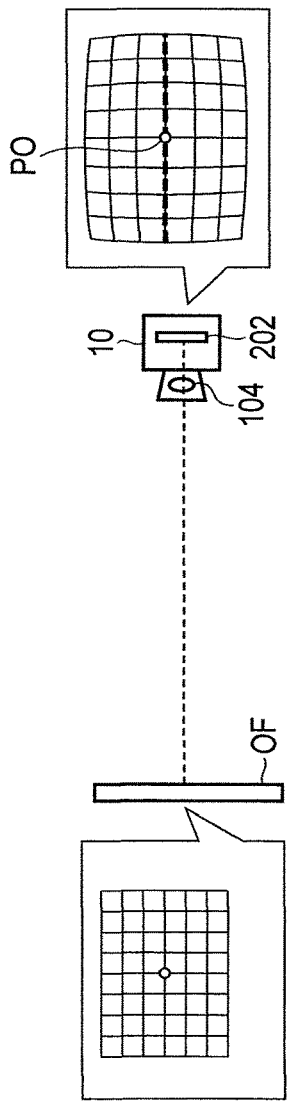
FIGS. 9A, 9B and 9C are views for explaining a point of view to obtain a coefficient α.

First, imaging such an object OF having a lattice pattern as shown in FIG. 9A is assumed. Since a distortion aberration is point-symmetrically produced with an optical axis at the center in a normal situation, when the object OF having the lattice pattern is photographed, a center line of a captured image (a line running through an image center P0) is a straight line as shown in FIG. 9A.

Figure 9B:
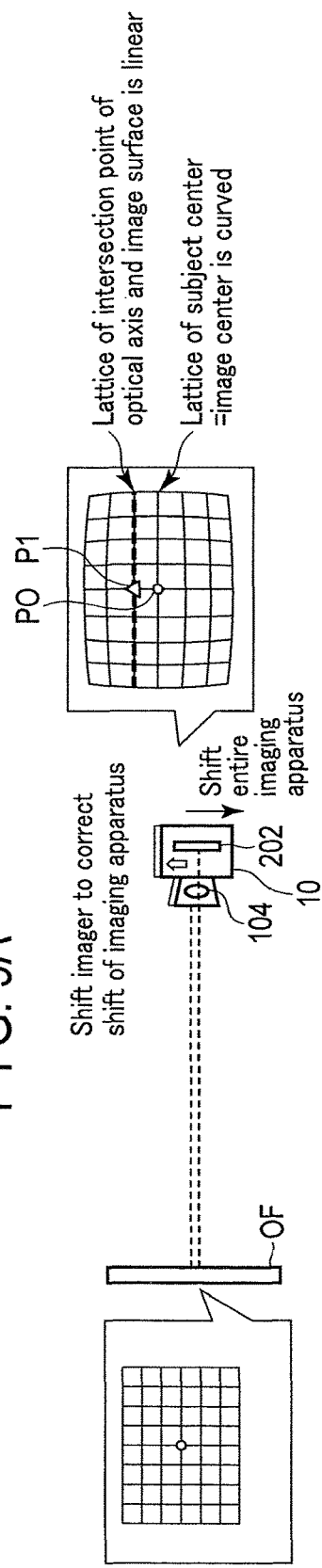

Further, when the imager 202 is driven to suppress a blur as shown in FIG. 9B, a shape of the distortion aberration on the image surface changes as described above. In this case, the center line of the captured image curves. However, a change in shape of the distortion aberration when the imager 202 is driven is caused due to a deviation between the image center and the optical axis alone. Thus, as shown in FIG. 9B, a line running through a point P1 on the captured image having an original optical axis center (a center of generation of an aberration) is a straight line.

Figure 9C:
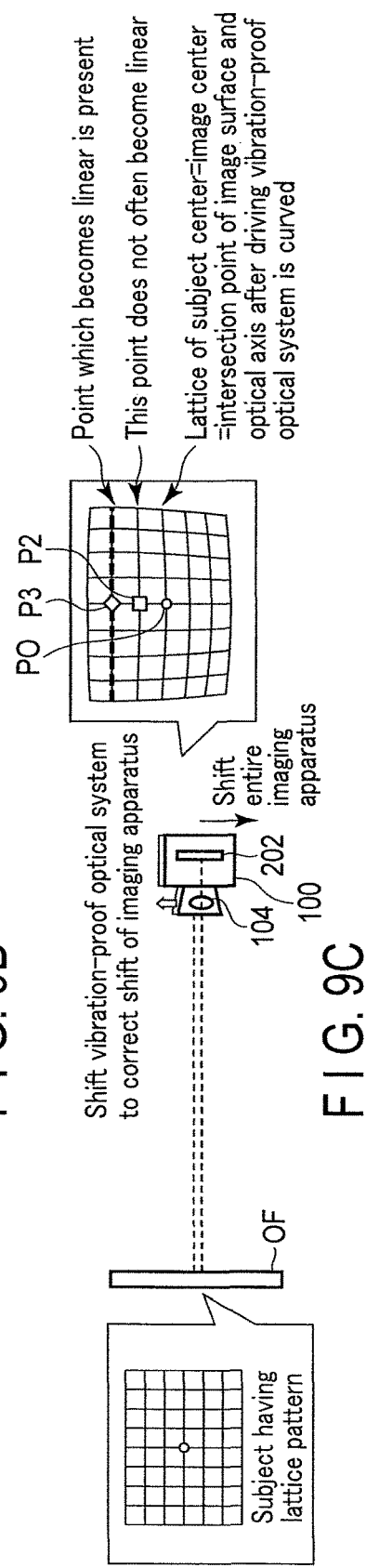

Furthermore, when the vibration-proof optical system 104 is driven to suppress a blur as shown in FIG. 9C, the shape of the distortion aberration on the image surface likewise changes as described above. In this case, the center line of the captured image curves. A change in distortion aberration shape due to a deviation between the image center and the optical axis and a change in distortion aberration shape due to driving (eccentricity) of the vibration-proof optical system are produced on the basis of different principles. As described above, the change in distortion aberration shape due to a deviation between the image center and the optical axis and the change in distortion aberration shape due to the driving (the eccentricity) of the vibration-proof optical system have a correlation. That is, even if the distortion aberration shape changes due to the driving (the eccentricity) of the vibration-proof optical system, points at which the captured lattice becomes linear are dispersedly present (a point P3 in FIG. 9C).

As described above, when a deviation amount between the image center P0 and the point P3 at which the lattice is linearly imaged is treated as a temporary deviation amount between the image center and the optical axis, the shape of the distortion aberration which deforms with the driving of the vibration-proof optical system can be approximated by the shape of the distortion aberration which deforms with the deviation between the image center and the optical axis center. However, as shown in FIG. 9C, it is often the case that each point at which the imaged lattice becomes linear does not correspond to an intersection point of the image surface and the optical axis (a point P2 in FIG. 9C) before driving the vibration-proof optical system. Thus, a coordinate of the point at which the lattice is linearly imaged cannot be obtained from the driving amount of the vibration-proof optical system by simple arithmetic. Thus, when the vibration-proof optical system is driven in the following procedure, the coordinate of the point at which the imaged lattice becomes linear is retrieved.

Figure 10:
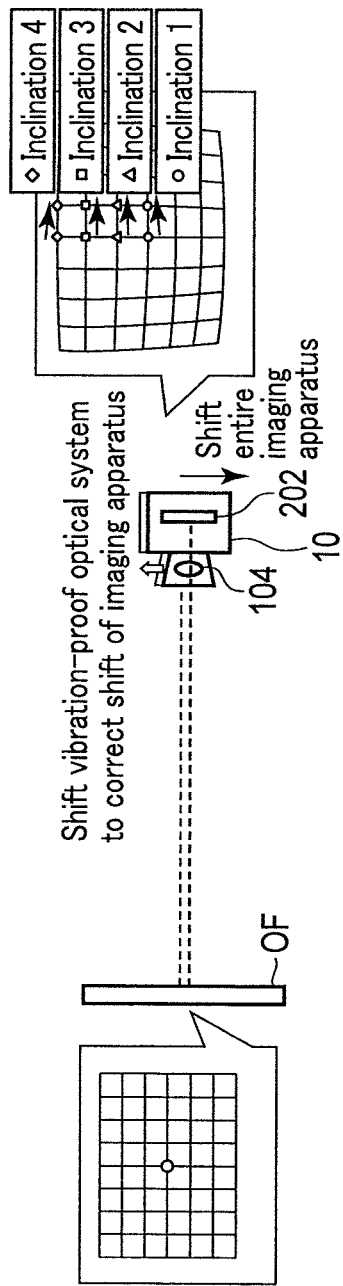
FIG. 10 is a view for explaining a measurement system at the time of obtaining the coefficient α.

(Procedure 1) A consideration will be given as to such a measurement system to image the object OF having the lattice pattern by the imaging apparatus 200 as shown in FIG. 10. In such a measurement system, the imaging system 10 (the imaging apparatus 200 having the imaging optical system 100 attached thereto) is shifted for an arbitrary amount (an arbitrary blur is given). Moreover, the vibration-proof optical system 104 is driven so that an image blur due to this shift can be corrected. In this state, the object OF having the lattice pattern is imaged by the imaging apparatus 200.

(Procedure 2) As shown in FIG. 11, a captured image is searched for inclinations 1 to 4 between respective points on the same line. After the search, of the inclinations 1 to 4, one having a value 0 (i.e., a point at which the imaged lattice is linear) is estimated by, e.g., a regression calculation or the like. For example, assuming that values of the inclinations 1 to 4 are obtained as shown in FIG. 12, the point at which the imaged lattice is linear can be considered to be present at a position which is 0 mm in a lateral direction and 2.42 mm in a height direction from a center point. Here, a coordinate of a point at which the inclination is 0 is estimated by the regressive calculation or the like. A method of calculating the coordinate of the point at which the inclination is 0 is not restricted to the regressive calculation. For example, when the lattice patter is made finer in advance, the inclination can be more precisely calculated. In this case, calculating the coordinate of the point at which the inclination approximates 0 to the greatest extent can substitute for the regressive calculation or the like.

(Procedure 3) (Procedure 1) and (Procedure (2) are repeated for an arbitrary number of times while changing a shift amount of the imaging system 10. Moreover, as shown in FIG. 13, each driving amount of the vibration-proof optical system (which is proportionate to the driving amount of the imager) and a height of each point at which the imaged lattice becomes linear (an image height) are plotted. When the plotted points are linearly approximated, an inclination of the straight line is the coefficient α.

In (Procedure 1) to (Procedure 3), it is assumed that an actual captured image is used. The present invention is not restricted thereto, and the coefficient α may be, calculated by a simulation using ray tracing or the like. Additionally, (Procedure 1) and (Procedure 2) are assumed to be repeated in the description. The present invention is not restricted thereto, (Procedure 1) and (Procedure 2) may be performed only once to calculate the coefficient α. Further, the driving amount of the imager can be expressed as a driving amount of the vibration-proof optical system on the basis of Expression (2). Thus, the coefficient α may be calculated from a relationship between the driving amount of the imager 202 and a height of the point at which the imaged lattice becomes linear. In this case, even if image surface moving amount sensitivity is not 1, information of the correlation can be recorded.

Here, a description will now be given as to FIG. 8. At a step S6, the control section 210 inputs the converted central deviation amount obtained at the step S5 to the distortion aberration correcting section 216, and performs the distortion aberration correction to the captured image. For example, the distortion aberration correcting section 216 determines the converted central deviation amount as the deviation amount between the image center and the optical axis and carries out the distortion aberration correction based on Expression (1). Then, the control section 210 performs correction other than the distortion aberration correction as required, and records the captured image in the recording section 204.

At a step S7, the control section 210 determines whether the photographing operation is to be terminated. For example, when the recording start button is again pushed by the photographer or the power supply of the imaging apparatus 200 is turned off, the photographing operation is determined to be terminated. When the photographing operation has been determined not to be terminated at the step S7, the processing returns to the step S2. In this case, the photographing operation is continued. When the photographing operation has been determined to be terminated at the step S7, the processing in FIG. 8 is finished.

As described above, in this embodiment, the information indicative of the correlation between the shape of the distortion aberration on the image surface of the imager corresponding to the driving amount of the vibration-proof optical system and the shape of the distortion aberration on the image surface of the imager corresponding to the deviation of the image center and the optical axis center is recorded in the recording section. Further, the driving amount of the vibration-proof optical system is converted into the deviation amount of the image center and the optical axis center on the basis of the information indicative of this correlation, and the same distortion aberration correction as the correction to the distortion aberration point-symmetrically produced at the optical axis center is performed on the basis of this converted deviation amount. Consequently, the distortion aberration correction taking deformation of the distortion aberration on the image surface due to the eccentricity of the vibration-proof optical system into account can be accurately performed with the approximative but simple configuration.

Here, in FIG. 8, a blur is necessarily suppressed. Detection and suppression of a blur may be started in accordance with an instruction from the photographer. Furthermore, they may be carried out before start of the photographing operation (e.g., at the time of display of live view images).

Moreover, the correlation information recording section 108 does not have to be necessarily provided in the imaging optical system 100. The correlation information recording section 108 may be provided in, e.g., the imaging apparatus 200. Additionally, the correlation information recording section 108 may be provided in a server or the like which is different from the imaging optical system 100 and the imaging apparatus 200.

Second Embodiment

Figure 14:
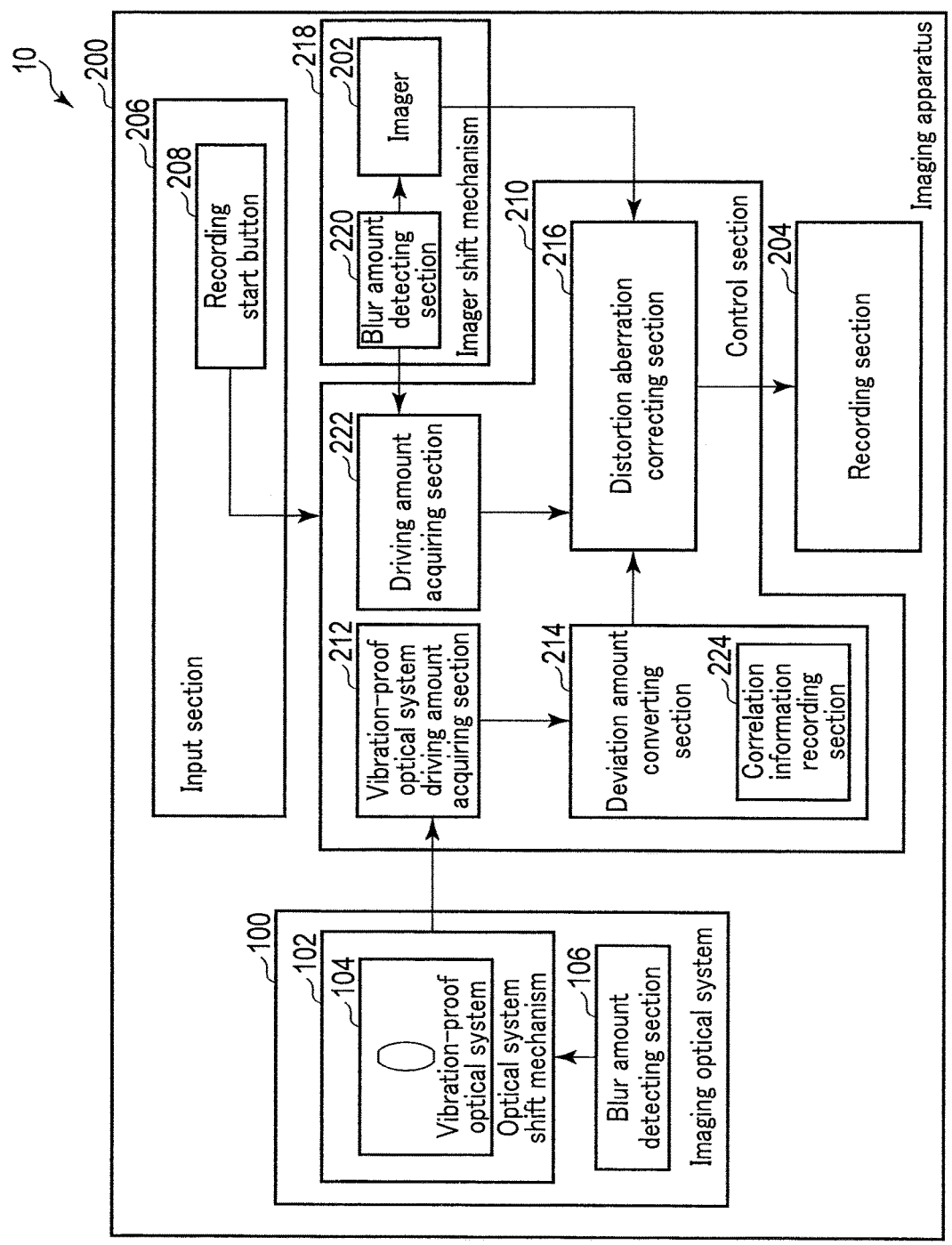
FIG. 14 is a view showing a configuration of an imaging system according to a second embodiment.

A second embodiment will now be described. FIG. 14 is a view showing a configuration of an imaging system according to the second embodiment. In this embodiment, an imaging apparatus 200 includes an imaging optical system 100, an imager shift mechanism 218, a recording section 204, an input section 206, and a control section 210. Of these members, the recording section 204 and the input section 206 are the same as those described in the first embodiment. Thus, they are denoted by the same reference numerals as those in FIG. 7 to omit a description thereof.

In the second embodiment, the imaging optical system 100 is provided integrally with the imaging apparatus 200.

A basic configuration of the imaging optical system 100 in the second embodiment is the same as that described in the first embodiment.

The imager shift mechanism 218 includes an imager 202 which is configured to be driven in a direction parallel to an image surface. Further, the imager shift mechanism 218 includes a blur amount detecting section 220. The blur amount detecting section 220 is, e.g., a gyro sensor or an acceleration sensor, and detects a blur amount produced in the imager 202. The imager shift mechanism 218 drives the imager 202 on the basis of the blur amount detected by the blur amount detecting section 220 to suppress an image blur.

The control section 210 in the second embodiment include a vibration-proof optical system driving amount acquiring section 212, a deviation amount converting section 214, a distortion aberration correcting section 216, and an imager driving amount acquiring section 222 as well.

The deviation amount converting section 214 in the second embodiment includes a correlation information recording section 224. The correlation information recording section 224 corresponds to the correlation information recording section 108. The correlation information recording section 224 records information indicative of a correlation between a shape of a distortion aberration on an image surface of the imager 202 corresponding to a driving amount of the vibration-proof optical system 104 and a shape of a distortion aberration on the image surface of the imager 202 corresponding to a deviation between an image center and an optical axis center.

The imager driving amount acquiring section 222 acquires a driving amount of the imager 202 from the imager shift mechanism 218.

Figure 15:
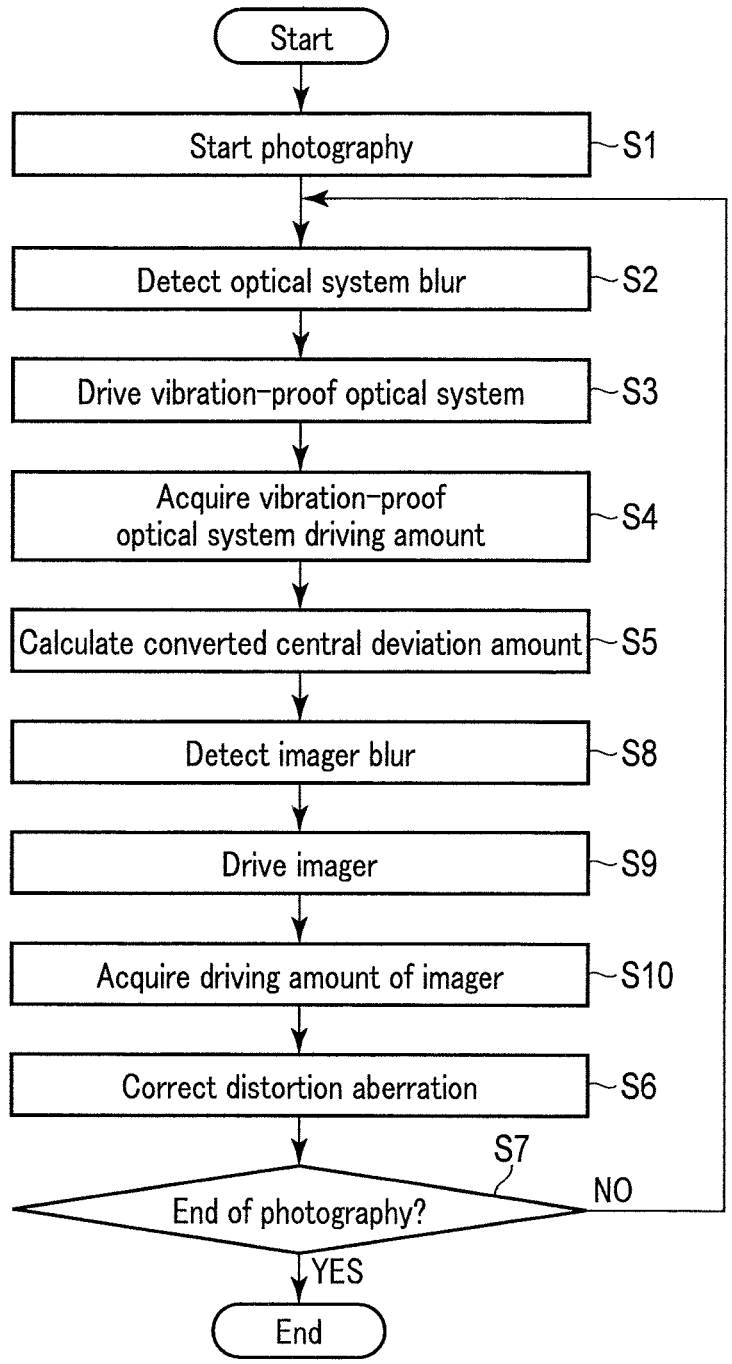
FIG. 15 is a flowchart showing an imaging operation in the second embodiment.

An operation of the imaging system 10 in the second embodiment will now be described. FIG. 15 is a flowchart showing a photographing operation in the second embodiment. Here, FIG. 15 is a flowchart of a moving image photographing operation. However, the distortion aberration correction described in the following moving image photographing operation can be applied even during a still image photographing operation. Furthermore, in operations in FIG. 15, the same operations as those in the first embodiment are denoted by the same step reference numerals as these in FIG. 8 to appropriately omit a description thereof.

Operations of steps S1 to S4 in FIG. 15 are the same as those of the steps S1 to S4 in FIG. 8, thereby omitting a description thereof.

At a step S5, the control section 210 calculates a converted central deviation amount by using the deviation amount converting section 214. The converted central deviation amount may be carried out in, e.g., the same manner as the first embodiment. Furthermore, as described above, the information of the correlation may be an approximate expression based on a quadratic polynomial or a polynomial of a higher degree. Such an approximate expression is obtained by, e.g., the following procedure.

(Procedure 1) The imaging apparatus 200 is shifted for an arbitrary amount (an arbitrary blur is given). Moreover, the vibration-proof optical system 104 is driven so that an image blur due to this shift can be corrected. In this state, an object OF having a lattice pattern is imaged by the imaging apparatus 200. Such imaging is performed for an arbitrary number of times while changing a shift amount of the imaging apparatus 200. For example, the imaging is carried out for 11 times while shifting the imaging apparatus 200 for 0.1 mm at a time in the range of 0 mm to 1 mm.

(Procedure 2) The imaging apparatus 200 is shifted for the same amount as that in (Procedure 1). Additionally, the imager 202 is driven so that the image blur due to this shift can be corrected. In this state, the object OF having the lattice pattern is imaged by the imaging apparatus 200. Such imaging is performed for the same number of times as that in (Procedure 1) while changing a shift amount of the imaging apparatus 200. For example, imaging is performed for 11 times while shifting the imaging apparatus 200 for 0.1 mm at a time in the range of 0 mm to 1 mm.

Figure 16:
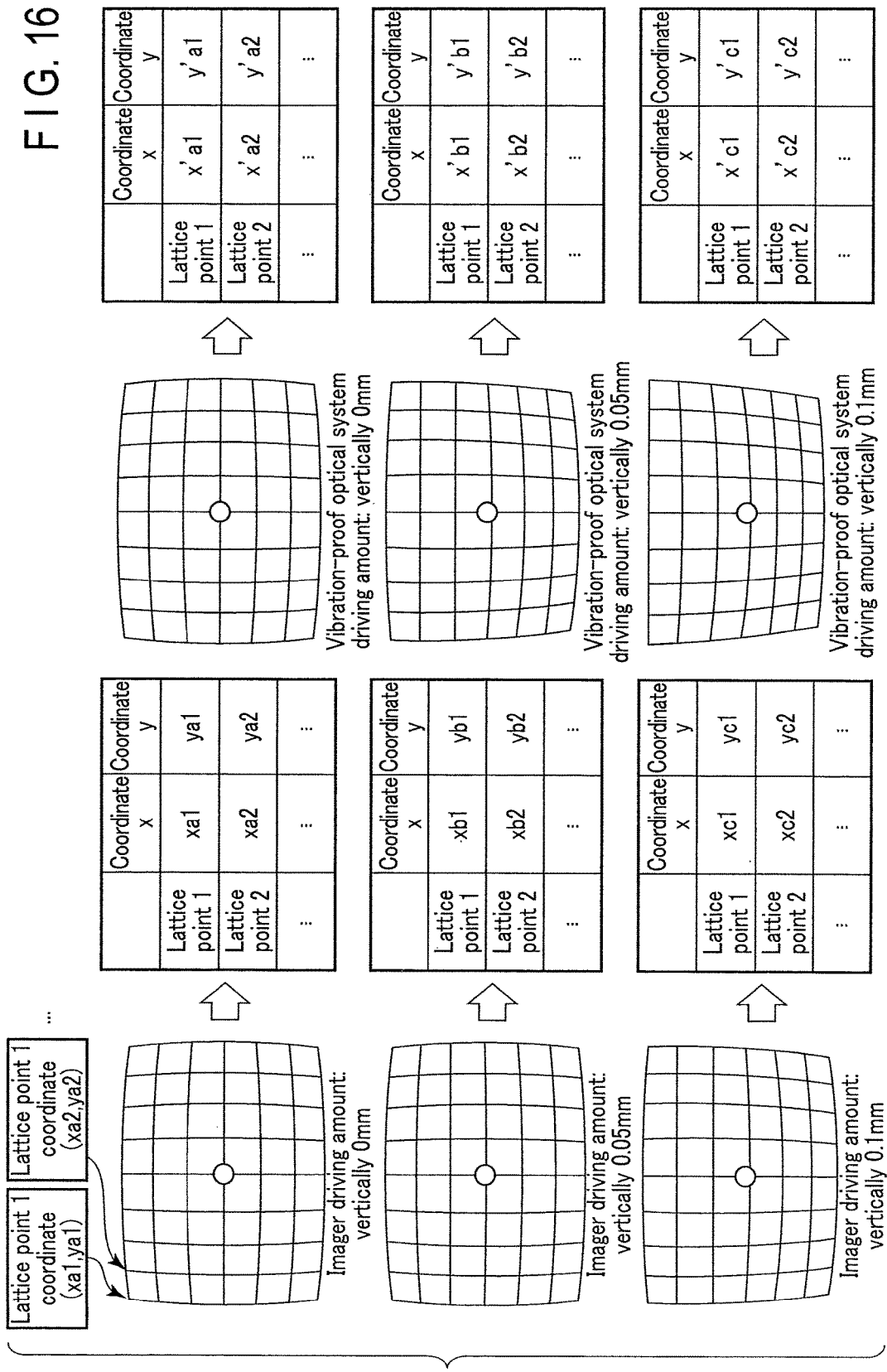
FIG. 16 is a view showing lattice points of respective captured images acquired by (Procedure 1) and (Procedure 2)

(Procedure 3) As shown in FIG. 16, positions of lattice points of respective captured images acquired in (Procedure 1) and (Procedure 2) are obtained. The positions of the lattice points may be, for example, visually acquired or may be automatically acquired by using a well-known technology such as pattern matching.

(Procedure 4) A sum total of Euclidean distances between the coordinate positions of the lattice points in the captured image when the vibration-proof optical system 104 is driven for an arbitrary amount and the coordinate positions of the lattice points in the captured image when the imager 202 is driven for an arbitrary amount is calculated. Further, a combination of a driving amount of the vibration-proof optical system 104 and a driving amount of the imager 202 which minimizes this sum total is obtained. This combination is a combination of driving amounts which realize the highest similarity of distortion aberration shapes on the image surface. Here, a correlation between the distortion aberration shape on the image surface involved in driving of the vibration-proof optical system and the distortion aberration shape on the image surface involved in driving of the imager is calculated from the sum total of the Euclidean distances between the coordinate positions. On the other hand, the correlation may be obtained by calculating a Euclidean distance of the captured image itself. Furthermore, the correlation may be calculated from a Euclidean distance in a part of the captured image such as a center line alone rather than the Euclidean distances the coordinate points in the entire captured image.

(Procedure 5) As shown in FIG. 17, the relationship between the driving amount of the vibration-proof optical system 104 and the driving amount of the imager 202 obtained by (Procedure 4) is plotted. An approximate expression is calculated from the plotted points by using a well-known technique such as a least-squares method.

Here, a description will now be again given to FIG. 15. At a step S8, the blur amount detecting section 220 detects a blur amount of the imaging apparatus 200. At a step S9, the imager shift mechanism 218 drives the imager 202 to cancel the blur of the imager 202 detected by the blur amount detecting section 220. Consequently, the blur (an image blur) on the image surface of the imager 202 is suppressed. At a step S10, the control section 210 acquires a driving amount of the imager 202.

In this embodiment, the vibration-proof optical system 104 is likewise driven at the step S4. Thus, an amount of correcting the image blur is a sum of the driving amount of the vibration-proof optical system 104 and the driving amount of the imager 202. It is assumed that a proportion of each driving amount at this moment is, e.g., preset. For example, if a driving proportion is 1:1, each of the driving amount of the vibration-proof optical system 104 and the driving amount of the imager 202 to the detected blur amount is 50%. This proportion may be determined on the basis of a frequency of the blur. For example, when the optical system shift mechanism 102 is configured so that it can highly accurately drive the vibration-proof optical system 104 and the imager shift mechanism 218 is configured so that it cannot highly accurately drive the imager 202, they may be configured in such a manner that a blur of a high frequency is corrected by driving the vibration-proof optical system 104 and a blur of a low frequency is corrected by driving the imager 202.

At a step S6, the control section 210 inputs the converted central deviation amount obtained at the step S5 to the distortion aberration correcting section 216, and performs distortion aberration correction to the captured image. For example, the distortion aberration correcting section 216 determines a value obtained by adding the converted central deviation amount and the deviation amount between the image center and the optical axis due to driving of the imager 202 as a deviation amount between the image center and the optical axis, and performs the distortion aberration correction based on Expression (1). Then, the control section 210 carries out correction other than the distortion aberration correction as required, and records the captured image in the recording section 204.

At a step S7, the control section 210 determines whether the photographing operation is to be terminated. For example, if it has been determined that the photographing operation is not to be terminated at the step S7, the processing returns to the step S2. In this case, the photographing operation is continued. If it has been determined that the photographing operation is to be terminated at the step S7, the processing in FIG. 15 is finished.

As described above, in this embodiment, likewise, it is possible accurately perform the distortion aberration correction taking deformation of the distortion aberration on the image surface due to the eccentricity of the vibration-proof optical system into consideration with the use of a simple configuration.

Further, in the second embodiment, blurs are suppressed by using both driving of the vibration-proof optical system and driving of the imager. Thus, a size of a suppressible blur can be increased as compared with a case where one of these types of driving is solely used. Furthermore, since an accuracy of driving of the vibration-proof optical system is different from an accuracy of driving of the imager, it is possible to suppress blurs corresponding to frequencies of the blurs.

Here, the imaging apparatus 200 according to this embodiment has the two blur amount detecting sections, i.e., the blur amount detecting section 106 which detects a blur amount of the imaging optical system 100 and the blur amount detecting section 220 which detects a blur amount of the imager 202. On the other hand, since both the imaging optical system 100 and the imager 202 are provided in the imaging apparatus 200, the imaging apparatus 200 may include a single blur amount detecting section. In this case, one of a blur amount of the imaging optical system 100 and a blur amount of the imager 202 is considered to be the same as the other, and driving is performed. It is to be noted that a circuit which estimates a blur amount at a necessary position from a blur amount detected by one blur amount detecting section may be additionally provided.

Moreover, in FIG. 15, blurs are necessarily suppressed. Detection and suppression of blurs may be started in accordance with an instruction from a photographer. Additionally, they may be started before beginning the photographing operation (e.g., at the time of displaying live view images).

Further, in FIG. 15, the optical system shift image stabilization and the imager shift image stabilization are sequentially carried out. On the other hand, the optical system shift image stabilization and imager shift image stabilization may be concurrently carried out.

Furthermore, the correlation information recording section 224 does not have to be necessarily provided in the blur amount converting section 214. The correlation information recording section 224 may be provided separately from the control section 210. Moreover, the correlation information recording section 224 may be provided in a server or the like different from those of the imaging optical system 100 and the imaging apparatus 200.

Third Embodiment

Figure 18:
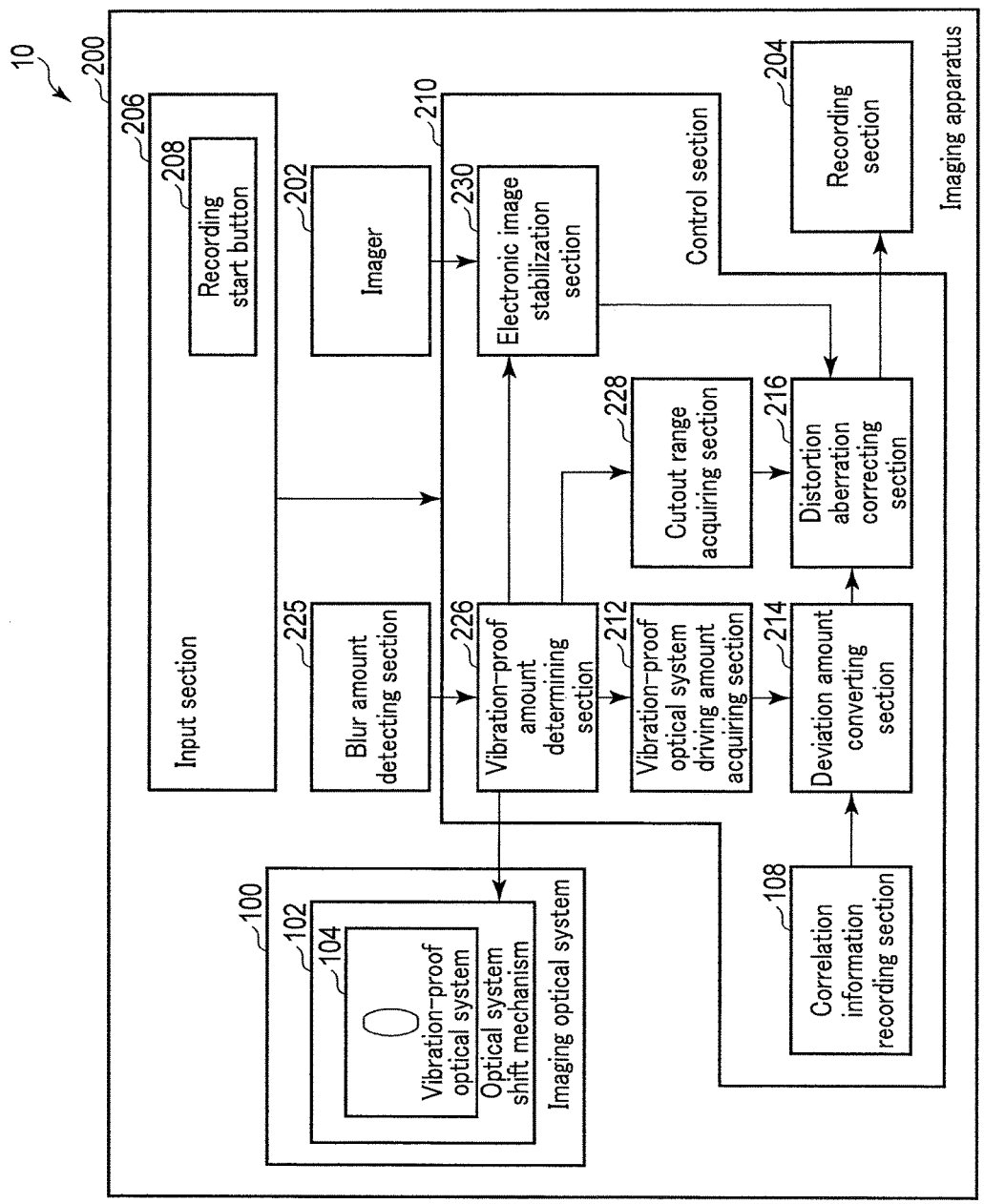
FIG. 18 is a view showing a configuration of an imaging system according to a third embodiment.

A third embodiment will now be described. FIG. 18 is a view showing a configuration of an imaging system according to the third embodiment. In this embodiment, an imaging apparatus 200 includes an imaging optical system 100, an imager 202, a recording section 204, an input section 206, a control section 210, and a blur amount detecting section 225. Of these members, the recording section 204 and the input section 206 are the same as those described in the first embodiment. Thus, these members are denoted by the same reference numerals as those in FIG. 7 to omit a description thereof.

The blur amount detecting section 225 is, e.g., a gyro sensor or an acceleration sensor, and detects a blur amount produced in a housing of the imaging apparatus 200.

Further, the control section 210 in the third embodiment includes a vibration-proof amount determining section 226, a cutout range acquiring section 228, and an electronic image stabilization section 230 in addition to a vibration-proof optical system driving amount acquiring section 212, a deviation amount converting section 214, and a distortion aberration correcting section 216.

Furthermore, the control section 210 in the third embodiment includes a correlation information recording section 224 at a position different from that of the deviation amount converting section 214. The correlation information recording section 224 corresponds to the correlation information recording section 108 like the second embodiment. The correlation information recording section 224 records information indicative of a correlation between a shape of a distortion aberration on an image surface of the imager 202 corresponding to a driving amount of the vibration-proof optical system 104 and a shape of a distortion aberration on the image surface of the imager 202 corresponding to a deviation between an image center and an optical axis center.

The vibration-proof amount determining amount 226 determines a driving amount of the vibration-proof optical system 104 and a cutout range provided by the electronic image stabilization section 230 on the basis of a blur amount detected by the blur amount detecting section 225, respectively.

The cutout range acquiring section 228 acquires the cutout range provided by the electronic image stabilization section 230 from the vibration-proof amount determining section 226.

The electronic image stabilization section 230 cuts out a region which is a part of a captured image on the basis of the cutout range determined by the vibration-proof amount determining section 226, thereby suppressing an image blur.

Figures 19, 20:
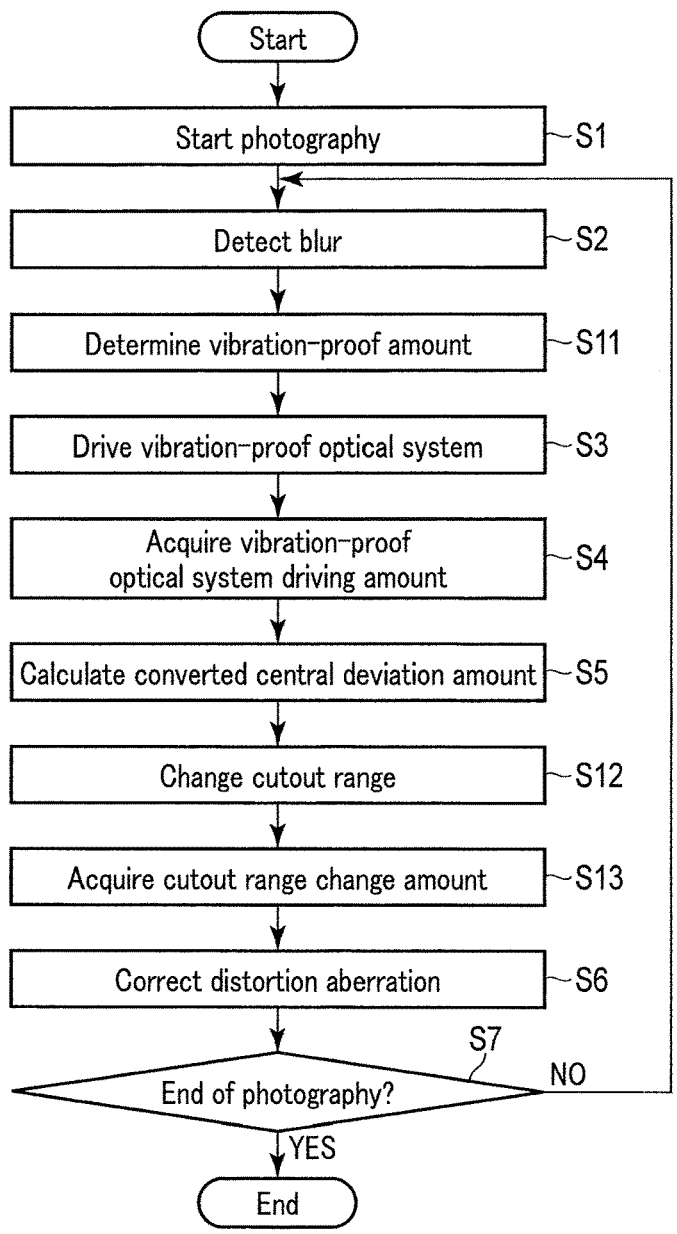
FIG. 19 is a flowchart showing a photographing operation in the third embodiment.
FIG. 20 shows an example of a table showing each correlation between a distortion aberration shape on an image surface based on a driving amount of a vibration-proof optical system and a distortion aberration shape on the image surface based on a deviation amount between an image center and an optical axis center.

An operation of an imaging system in the third embodiment will now be described hereinafter. FIG. 19 is a flowchart showing a photographing operation in the third embodiment. Here, FIG. 19 is a flowchart of a moving image photographing operation. However, the distortion aberration correction described in the following moving image photographing operation can be applied even during a still image photographing operation. Furthermore, in the operation of FIG. 19, each operation which is equal to a counterpart in the first embodiment is denoted by the same reference numeral as that in FIG. 8 to appropriately omit a description thereof.

Operations of steps S1 and S2 in FIG. 19 are the same as the operations of the steps S1 and S2 in FIG. 8, thereby omitting a description thereof. In FIG. 19, after a blur amount is detected at the step S2, processing of a step S11 is carried out.

At the step S11, the control section 210 determines a driving amount of the vibration-proof optical system 104 and a cutout range provided by the electronic image stabilization section 230 by using the vibration-proof amount determining section 226 on the basis of the blur amount detected by the blur amount detecting section 225, respectively. It is assumed that a proportion of blur suppression performed by driving of the vibration-proof optical system 104 and blur suppression performed by processing of the electronic image stabilization section 230 at this moment is, e.g., preset. For example, if the proportion is 1:1, each of the proportion of the blur suppression performed by the driving of the vibration-proof optical system 104 to the detected blur amount and the proportion of the blur suppression performed by the processing of the electronic image stabilization section 230 to the same is 50%.

Operations of steps S3 and S4 in FIG. 19 are the same as the operations of the steps S3 and S4 in FIG. 8, and hence a description thereof will be omitted.

At a step S5, the control section 210 calculates a converted central deviation amount by using the deviation amount converting section 214. The converted central deviation amount may be calculated in the same manner as, e.g., the first embodiment. Moreover, the converted central deviation amount may be calculated on the basis of such a table as shown in FIG. 20 showing a correlation between a distortion aberration shape on the image surface based on the driving amount of the vibration-proof optical system and a distortion aberration shape on the image surface based on the deviation amount between the image center and the optical axis center recorded in the correlation information recording section 224 in advance.

How to calculate the correlation at the time of creating the table shown in FIG. 20 is based on (Procedure 1) to (Procedure 5) in the first embodiment or in the second embodiment. In case of obtaining a converted central deviation amount concerning a driving amount of the vibration-proof optical system 104 which is not listed in the table, for example, the deviation amount converting section 214 may make reference to the closest driving amount in the information recorded in the correlation information recording section 224 to obtain the converted central deviation amount. In this case, for example, if the driving amount of the vibration-proof optical system 104 is 0.12 [mm], the deviation amount converting section 214 uses 0.3 [mm] which is a converted central deviation amount corresponding to a driving amount 0.1 [mm]. Further, the deviation amount converting section 214 may obtain the converted central deviation amount by linear interpolation or the like using driving amounts close to a current driving amount in the information recorded in the correlation information recording section 224. In this case, for example, if the driving amount of the vibration-proof optical system 104 is 0.12 [mm], the deviation amount converting section 214 obtains the converted central deviation amount by the linear interpolation of a converted central deviation amount for a driving amount 0.1 [m] and a converted central deviation amount for a driving amount 0.2 [mm].

Here, a description will now be again given as to FIG. 19. At a step S12, the electronic image stabilization section 230 sets the determined cutout range. At a step S13, the electronic image stabilization section 230 cuts out the captured image in accordance with the set cutout range. Since the cutout range is shifted to cancel the blur, the blur (an image blur) on the image surface of the imager 202 is suppressed.

At a step S6, the control section 210 inputs the converted central deviation amount obtained at the step S5 to the distortion aberration correcting section 216, and performs the distortion aberration correction to the captured image. For example, the distortion aberration correcting section 216 determines a value obtained by adding the converted central deviation amount to the deviation amount between the image center and the optical axis caused due to the driving of the imager 202 as a deviation amount between the image center and the optical axis, and performs the distortion aberration correction based on Expression (1). Then, the control section 210 carries out correction other than the distortion aberration correction as required, and records the captured image in the recording section 204.

At a step S7, the control section 210 determines whether the photographing operation is to be terminated. When it has been determined that the photographing operation is not to be terminated at the step S7, the processing returns to the step S2. In this case, the photographing operation is continued. When it has been determined that the photographing operation is to be terminated at the step S7, the processing in FIG. 19 is finished.

As described above, in this embodiment, likewise, it is possible to accurately carry out the distortion aberration correction taking deformation of the distortion aberration on the image surface due to eccentricity of the vibration-proof optical system into account with a simple configuration.

Furthermore, in the third embodiment, blurs are suppressed by using both the optical system shift image stabilization and the electronic image stabilization. Thus, a size of a suppressible blur can be increased as compared with a case where one of these members is solely used.

Here, the imaging apparatus 200 in this embodiment has the single blur amount detecting section 225 alone. The blur amount detecting section 225 may be either the blur amount detecting section 106 or the blur amount detecting section 220. Moreover, the imaging apparatus 200 may include one or both of the blur amount detecting section 106 and the blur amount detecting section 220 in addition to the blur amount detecting section 225. Additionally, a circuit which estimates a blur amount at a necessary position from a blur amount detected by one blur amount detecting section may be additionally provided.

Further, in FIG. 19, blurs are necessarily suppressed. Detection and suppression of blurs may be started in accordance with an instruction from a photographer. Furthermore, they may be started before beginning the photographing operation (e.g., at the time of displaying live view images).

Moreover, in FIG. 19, the optical system image stabilization and the electronic image stabilization are sequentially carried out. On the other hand, the optical system image stabilization and the electronic image stabilization may be concurrently carried out.

Additionally, the correlation information recording section 224 may be provided in the deviation amount converting section 214. The correlation information recording section 224 may be provided separately from the control section 210. Further, the correlation information recording section 224 may be provided in a server or the like which is different from the imaging optical system 100 and the imaging apparatus 200.

Fourth Embodiment

Figure 21:
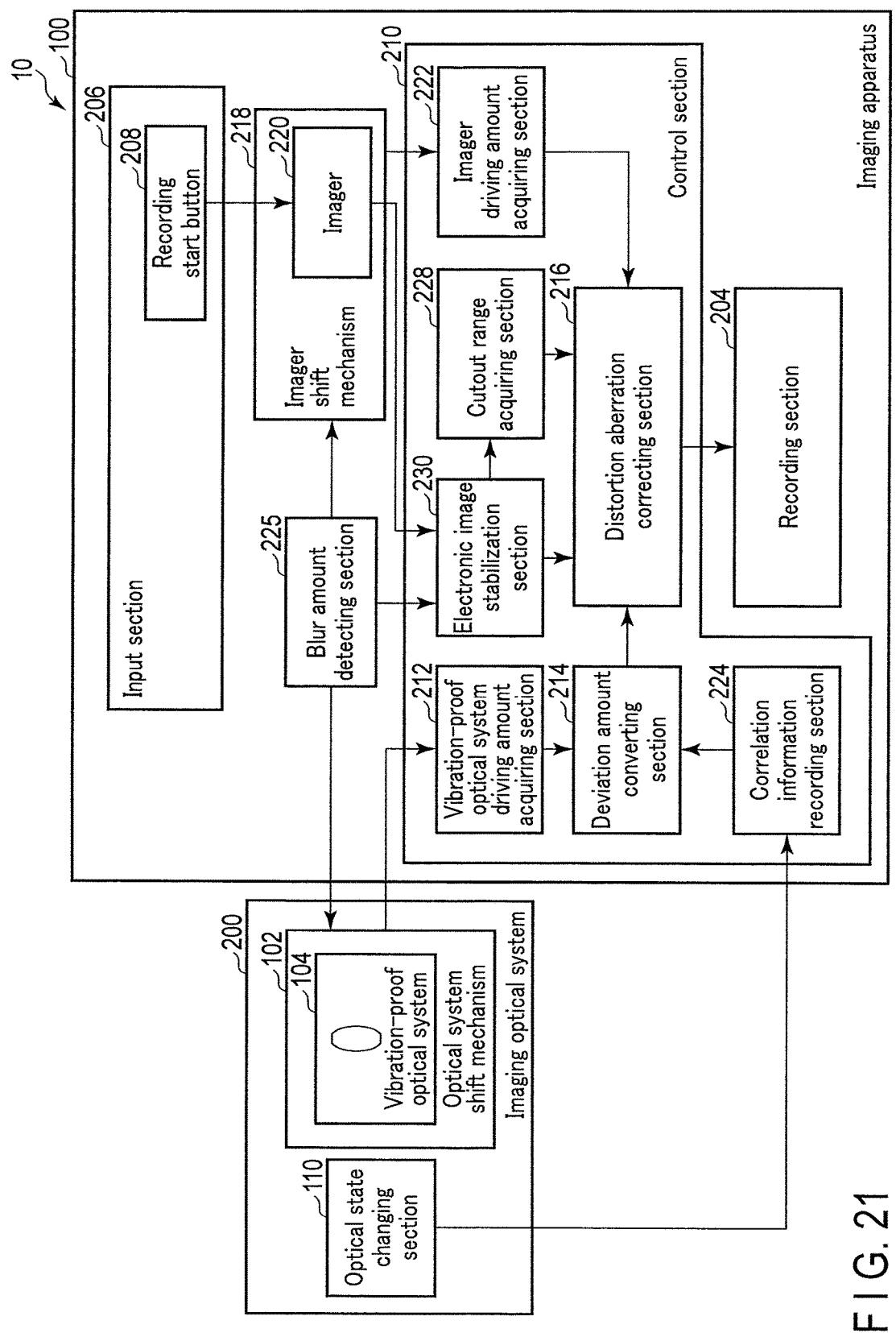
FIG. 21 is a view showing a configuration of an imaging system according to a fourth embodiment.

A fourth embodiment will now be described. FIG. 21 is a view showing a configuration of an imaging system according to the fourth embodiment. In this embodiment, an imaging apparatus 200 includes an imaging optical system 10 which can be attached to the imaging apparatus 200 like the first embodiment.

The imaging optical system 100 includes an optical system shift mechanism 102 and an optical state changing section 110.

The optical system shift mechanism 102 includes an optical system configured to condense luminous fluxes from an object' onto an image surface of an imager. Further, the optical system shift mechanism 102 includes a vibration-proof optical system 104. In this embodiment, the optical system shift mechanism 102 drives the vibration-proof optical system 104 in correspondence with a blur amount detected by a blur amount detecting section 225 of the imaging apparatus 200.

The optical state changing section 110 changes an optical state (e.g., a focal position and a focal distance) of the imaging optical system 100. The optical state changing section 110 includes a focusing optical system which adjusts a focal position of the imaging optical system 100 when it is driven in, e.g., an optical axis direction, and a variable power optical system which adjusts a focal distance of the imaging optical system 100 when it is driven in the optical axis direction.

The imaging apparatus 200 includes an imager shift mechanism 218, a recording section 204, an input section 206, a control section 210, and a blur amount detecting section 225. Of these members, the recording section 204 and the input section 206 are the same as those described in the first embodiment. Thus, these members are denoted by the same reference numerals as those in FIG. 7 to omit a description thereof.

The imager shift mechanism 218 includes an imager 202 configured to be driven in a direction parallel to the image surface. In this embodiment, the imager shift mechanism 218 drives the imager 202 in correspondence with a blur amount detected by the blur amount detecting section 225.

The control section 210 in the fourth embodiment includes a vibration-proof optical system driving amount acquiring section 212, a deviation amount converting section 214, a distortion aberration correcting section 216, an imager driving amount acquiring section 222, a cutout range acquiring section 228, and an electronic image stabilization section 230. Here, the vibration-proof optical system driving amount acquiring section 212, the deviation amount converting section 214, the distortion aberration correcting section 216, the imager driving amount acquiring section 222, the cutout range acquiring section 228, and the electronic image stabilization section 230 are the same as those described in the second or third embodiment. Thus, these members are denoted by the same reference numerals as those in FIG. 14 or FIG. 18 to omit a description thereof.

Further, the control section 210 in the fourth embodiment includes a correlation information recording section 224 at a position different from that of the deviation amount converting section 214. The correlation information recording section 224 corresponds to the correlation information recording section 108 like the second embodiment. The correlation information recording section 224 records information indicative of a correlation between a shape of a distortion aberration on the image surface of the imager 202 corresponding to a driving amount of the vibration-proof optical system 104 and a shape of a distortion aberration on the image surface of the imager 202 corresponding to a deviation between an image center and an optical axis center. In this embodiment, the information indicative of the correlation is recorded in accordance with each optical state. Particulars will be described later.

Figure 22:
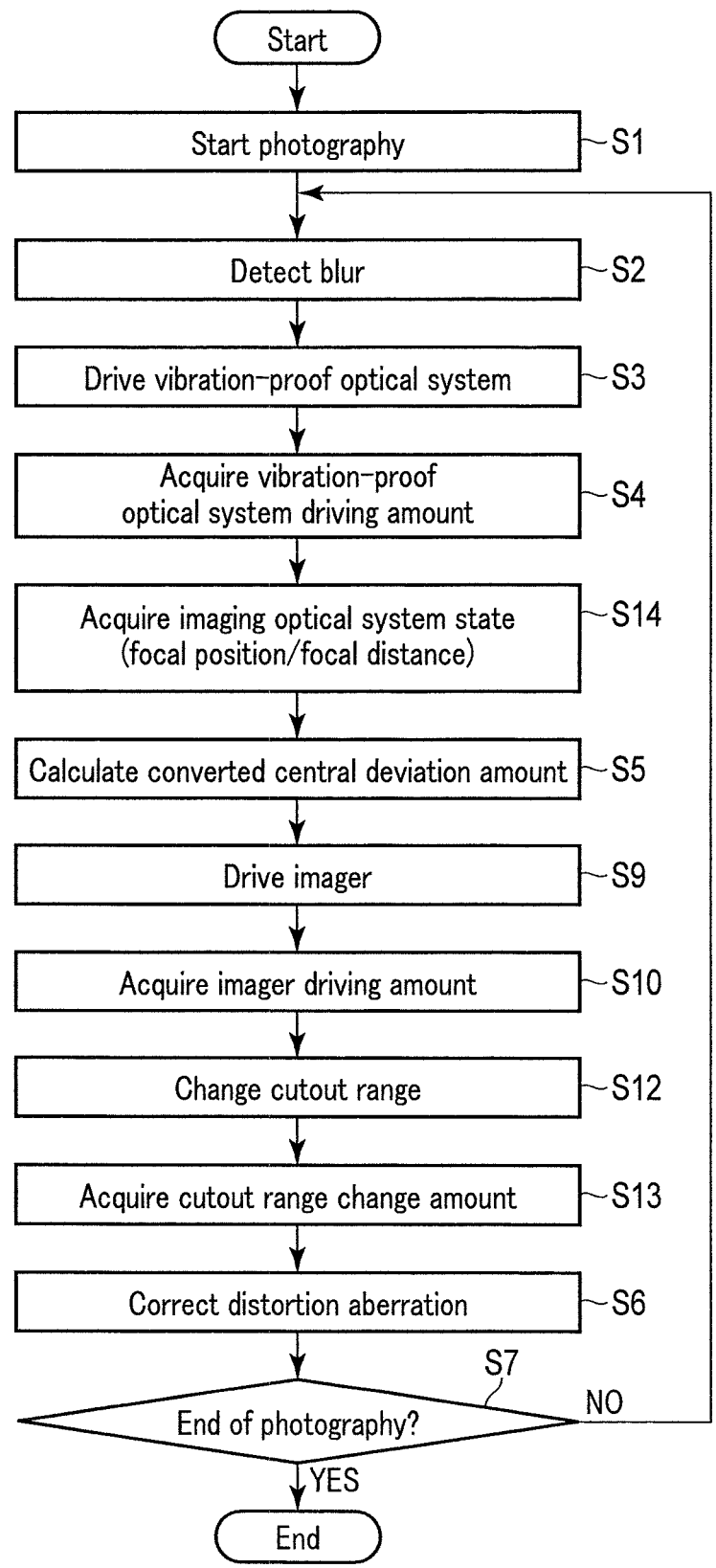
FIG. 22 is a flowchart showing a photographing operation in the fourth embodiment.

An operation of an imaging system 10 according to the fourth embodiment will now be described hereinafter. FIG. 22 is a flowchart showing a photographing operation in the fourth embodiment. Here, FIG. 22 is a flowchart of a moving image photographing operation. However, distortion aberration correction described in the following moving image photographing operation can be applied even during a still image photographing operation. Furthermore, in the operation of FIG. 22, operations equal to those in the first to third embodiments will be denoted by the same step reference numerals as those in FIG. 8, FIG. 15, or FIG. 19 to appropriately omit a description thereof.

Operations of steps S1 to S4 in FIG. 22 are the same as the operations of the steps S1 to S4 in FIG. 8, and hence a description thereof will be omitted. In the fourth embodiment, after the step S4, an operation of a step S14 is carried out. At the step S14, the control section 210 acquires an optical state (e.g., a focal position and a focal distance) of the imaging optical system 100 from the optical state changing section 110.

At a step S5, the control section 210 inputs the optical state of the imaging optical system 100 acquired from the optical state changing section 110 to a deviation amount converting section 214, and calculates a converted central deviation amount. The converted central deviation amount may be calculated in the same manner as the first embodiment, for example. However, in the fourth embodiment, the converted central deviation amount is calculated in correspondence with the optical state. In this case, the deviation amount converting section 214 acquires a coefficient α corresponding to the optical state from, e.g., such a table as shown in FIG. 23 in which each optical state is associated with the coefficient α.

How to calculate a correlation at the time of creating the table in FIG. 23 is based on (Procedure 1) to (Procedure 5) in the first embodiment or in the second embodiment. However, a point that the correlation is calculated while changing not only a shift amount of the imaging system 100 but also the optical state is different from (Procedure 1) to (Procedure 5) in the first embodiment or in the second embodiment. In FIG. 23, the coefficient α in optical states thinned out to some extent alone is recorded. The number of the coefficients α to be recoded can be appropriately set in correspondence with, e.g., a recording capacity or the like of the correlation information recording section 224. If the recording capacity of the correlation information recording section 224 allows, for example, the focal position or the focal distance may be divided in units of 0.1 mm, and the coefficient α may be recorded.

Moreover, in case of obtaining the converted central deviation amount concerning optical states which are not listed in the table, the deviation amount converting section 214 acquires α in an arbitrary optical state from, e.g., an approximate expression representing a relationship between a focal position X, a focal distance Y, and the coefficient α. Additionally, like the third embodiment, for example, the deviation amount converting section 214 may make reference to the closest optical state in the information recorded in the correlation information recording section 224 to obtain the converted central deviation amount. In this case, for example, when the focal distance is 11 mm and the focal distance is a middle distance which is close to infinite, the deviation amount converting section 214 uses α in a state where the focal position is infinite and the focal distance is 10 mm. Further, the deviation amount converting section 214 may obtain the converted central deviation amount by linear interpolation or the like using optical states close to a current optical state in the information recorded in the correlation information recording section 224. For example, when the focal distance is 15 mm and the focal position is between middle and near positions, the deviation amount converting section 214 obtains the converted central deviation amount (the coefficient α) by the linear interpolation using four coefficients, i.e., a coefficient $\alpha_{10\_near}$ when the focal distance is 10 mm and the focal position is a near position, a coefficient $\alpha_{10\_middle}$ when the focal distance is 10 mm and the focal position is a middle position, a coefficient $\alpha_{20\_near}$ when the focal distance is 20 mm and the focal position is a near position, and a coefficient $\alpha_{20\_middle}$ when the focal distance is 20 mm and the focal position is a middle position.

Operations of steps S9 and S10 in FIG. 22 are the same as the operations of the steps S9 and S10 in FIG. 15, operations of steps S12 and S13 in FIG. 22 are the same as the operations of the steps S12 and S13 in FIG. 19, and hence a description thereof will be omitted. It is to be noted that, in this embodiment, a correction amount of an image blur is a sum of a driving amount of the vibration-proof optical system 104, a driving amount of the imager 202, and a shift amount provided by the electronic image stabilization. It is assumed that a proportion of the respective driving amounts in this example is, e.g., preset. For example, if a driving proportion is 1:1:1, each of the driving amount of the vibration-proof optical system 104, the driving amount of the imager 202, and the shift amount provided by the electronic image stabilization to the detected blur amount is 33%.

At a step S6, the control section 210 inputs the converted central deviation amount obtained at the step S5 to the distortion aberration correcting section 216, and performs the distortion aberration correction to the captured image. For example, the distortion aberration correcting section 216 determines a value obtained by adding the converted central deviation amount to the deviation amount between the image center and the optical axis due to the driving of the imager 202 as a deviation amount between the image center and the optical axis, and performs the distortion aberration correction based on Expression (1). Then, the control section 210 carries out correction other than the distortion aberration correction as required, and then records the captured image in the recording section 204.

At a step S7, the control section 210 determines whether the photographing operation is to be terminated. If it has been determined that the photographing operation is not to be terminated at the step S7, the processing returns to the step S2. In this case, the photographing operation is continued. If it has been determined that the photographing operation is to be terminated at the step S7, the processing in FIG. 22 is finished.

As described above, in this embodiment, likewise, it is possible to accurately perform the distortion aberration correction taking deformation of the distortion aberration on the image surface due to eccentricity of the vibration-proof optical system into account with a simple configuration.

Furthermore, the correlation between a shape of the distortion aberration on the image surface of the imager corresponding to a driving amount of the vibration-proof optical system and a shape of the distortion aberration on the image surface of the imager corresponding to a deviation between the image center and the optical axis can change depending on an optical state of the imaging optical system. In this embodiment, even if the deformation of the distortion aberration corresponding to the optical state of the imaging optical system is taken into consideration, the distortion aberration can be corrected.

Moreover, in the fourth embodiment, blurs are suppressed by using the driving of the vibration-proof optical system, the driving of the imager, and the electronic image stabilization. Thus, a size of a suppressible blur can be increased as compared with a case where one of these factors is solely used.

Here, the imaging apparatus 200 in this embodiment includes the single blur amount detecting section 225 alone. The blur amount detecting section 225 may be either the blur amount detecting section 106 or the blur amount detecting section 220. Additionally, the imaging apparatus 200 may one or both of the blur amount detecting section 106 and the blur amount detecting section 220 in addition to the blur amount detecting section 225. Further, a circuit which estimates a blur amount at a necessary position from a blur amount detected by one blur amount detecting section may be additionally provided.

Furthermore, in FIG. 22, blurs are necessarily suppressed. Detection and suppression of blurs may be started in accordance with an instruction from a photographer. Furthermore, they may be started before beginning the photographing operation (e.g., at the time of displaying live view images).

Moreover, in FIG. 22, the driving of the vibration-proof optical system 104, the driving of the imager, and the electronic image stabilization are sequentially carried out. On the other hand, the driving of the vibration-proof optical system 104, the driving of the imager, and the electronic image stabilization may be concurrently carried out.

Additionally, the correlation information recording section 224 may be provided in the deviation amount converting section 214. The correlation information recording section 224 may be provided separately from the control section 210. Further, the correlation information recording section 224 may be provided in a server or the like which is different from those of the imaging optical system 100 and the imaging apparatus 200.

Further, each processing according to the foregoing embodiments can be stored as a program which can be executed by a CPU or the like as a computer. Besides, it can be stored in a storage medium of an external storage device such as a memory card, a magnetic disk, an optical disk, or a semiconductor memory, and then distributed. Furthermore, the CPU or the like reads the program stored in the storage medium of this external storage device, and an operation is controlled by the read program, thereby executing the above-described processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus which processes a captured image based on an image formed on an image surface of an imager by an imaging optical system including a vibration-proof optical system which is driven in correspondence with an image blur on the image surface, the image processing apparatus comprising:
a CPU or integrated circuit configured to perform operations including:
acquiring a driving amount of the vibration-proof optical system in a direction orthogonal to an optical axis of the imaging optical system;
correcting, in the captured image, a distortion aberration on the image surface based on a deviation amount between the optical axis and an image center of the captured image; and
calculating the deviation amount corresponding to the acquired driving amount as a converted central deviation amount based on a correlation between a shape of the distortion aberration on the image surface corresponding to the driving amount of the vibration-proof optical system and a shape of the distortion aberration on the image surface corresponding to the deviation amount,
wherein the CPU or integrated circuit is configured to correct the distortion aberration by using the converted central deviation amount as the deviation amount.

2. The apparatus according to claim 1, wherein the CPU or integrated circuit is configured to multiply the driving amount of the vibration-proof optical system by a predetermined coefficient to calculate the converted central deviation amount.

3. The apparatus according to claim 1, wherein the CPU or integrated circuit is configured to calculate the converted central deviation amount based on an approximate expression which approximates a relationship between the driving amount of the vibration-proof optical system and the converted central deviation amount.

4. The apparatus according to claim 1, wherein the CPU or integrated circuit is configured to calculate the converted central deviation amount based on a table showing a relationship between the driving amount of the vibration-proof optical system and the converted central deviation amount.

5. The apparatus according to claim 1, wherein:
the CPU or integrated circuit is configured to calculate the converted central deviation amount corresponding to an optical state of the imaging optical system, and
the CPU or integrated circuit is configured to correct the distortion aberration by using the converted central deviation amount corresponding to the optical state of the imaging optical system.

6. The apparatus according to claim 1, wherein the operations performed by the CPU or integrated circuit further include:
changing a cutout range of the captured image in correspondence with the image blur on the image surface; and
acquiring a change amount of the cutout range of the captured image, and
wherein the CPU or integrated circuit is configured to correct the distortion aberration by using the converted central deviation amount and the change amount of the cutout range.

7. An imaging apparatus comprising:
the image processing apparatus according to claim 1; and
the imager which captures an image formed by the imaging optical system.

8. The apparatus according to claim 7, further comprising:
an imager shift mechanism which drives the imager in correspondence with the image blur on the image surface,
wherein the operations performed by the CPU or integrated circuit further include acquiring a driving amount of the imager, and
wherein the CPU or integrated circuit is configured to correct the distortion aberration by further using the driving amount of the imager.

9. The apparatus according to claim 7, wherein the operations performed by the CPU or integrated circuit further include:
changing a cutout range of the captured image in correspondence with the image blur on the image surface; and
acquiring a change amount of the cutout range of the captured image, and
wherein the CPU or integrated circuit is configured to correct the distortion aberration by further using the change amount of the cutout range.

10. The apparatus according to claim 7, further comprising:
an imaging optical system including the vibration-proof optical system; and
an optical system shift mechanism which drives the vibration-proof optical system in correspondence with the image blue on the image surface.

11. The apparatus according to claim 10, further comprising:
a sensor which detects a blur amount of the imager or the imaging optical system,
wherein the CPU or integrated circuit is configured to acquire a driving amount of the vibration-proof optical system calculated based on the detected blur amount.

12. The apparatus according to claim 7, further comprising a memory in which information concerning the correlation is recorded.

13. An image processing method of processing a captured image based on an image formed on an image surface of an imager by using an imaging optical system including a vibration-proof optical system which is driven in correspondence with an image blur on the image surface, the method comprising:
acquiring a driving amount of the vibration-proof optical system in a direction orthogonal to an optical axis of the imaging optical system;
calculating a deviation amount corresponding to the driving amount of the vibration-proof optical system as a converted central deviation amount based on a correlation between a shape of a distortion aberration on the image surface corresponding to the driving amount of the vibration-proof optical system and a shape of a distortion aberration on the image surface corresponding to the deviation amount; and
correcting the distortion aberration by using the converted central deviation amount as the deviation amount.

14. An image processing apparatus which processes a captured image based on an image formed on an image surface of an imager by an imaging optical system including a vibration-proof optical system which is driven in correspondence with an image blur on the image surface, comprising:
vibration-proof optical system driving amount acquiring means for acquiring a driving amount of the vibration-proof optical system in a direction orthogonal to an optical axis of the imaging optical system;

distortion aberration correcting means for correcting, in the captured image, a distortion aberration on the image surface based on a deviation amount between the optical axis and an image center of the captured image; and deviation amount converting means for calculating the deviation amount corresponding to the driving amount acquired by the vibration-proof optical system driving amount acquiring means as a converted central deviation amount based on a correlation between a shape of the distortion aberration on the image surface corresponding to the driving amount of the vibration-proof optical system and a shape of the distortion aberration on the image surface corresponding to the deviation amount, wherein the distortion aberration correcting means corrects the distortion aberration by using the converted central deviation amount as the deviation amount.

\* \* \* \* \*